U S009916082B2

(12) United States Patent
Sakaguchi

(10) Patent No.: US 9,916,082 B2
(45) Date of Patent: Mar. 13, 2018

(54) DISPLAY INPUT APPARATUS AND COMPUTER-READABLE NON-TRANSITORY RECORDING MEDIUM WITH DISPLAY INPUT CONTROL PROGRAM RECORDED THEREON

(71) Applicant: KYOCERA Document Solutions Inc., Osaka (JP)

(72) Inventor: Shoichi Sakaguchi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 282 days.

(21) Appl. No.: 14/663,219

(22) Filed: Mar. 19, 2015

(65) Prior Publication Data
US 2015/0277750 A1    Oct. 1, 2015

(30) Foreign Application Priority Data

Mar. 28, 2014  (JP) .................. 2014-067633
Mar. 28, 2014  (JP) .................. 2014-067635
Mar. 28, 2014  (JP) .................. 2014-067637

(51) Int. Cl.
G06F 3/14       (2006.01)
G06F 3/0488     (2013.01)
(Continued)

(52) U.S. Cl.
CPC ....... *G06F 3/04883* (2013.01); *G03G 15/502* (2013.01); *G06F 3/041* (2013.01);
(Continued)

(58) Field of Classification Search
CPC .................................... G06F 3/14; G06F 3/17
(Continued)

(56) References Cited

U.S. PATENT DOCUMENTS 7,661,075 B2   2/2010 Lahdesmaki
7,681,149 B2   3/2010 Lahdesmaki
(Continued)

FOREIGN PATENT DOCUMENTS

CN     102456379 A    5/2012
EP       1926312 A    5/2008
(Continued)

OTHER PUBLICATIONS

Notice of Reasons for Refusal dated Apr. 26, 2016 mailed in the corresponding Japanese Patent Application No. 2014-067635.
(Continued)

*Primary Examiner* — Ruay Ho
(74) *Attorney, Agent, or Firm* — IP Business Solutions, LLC

(57) ABSTRACT

In a display input apparatus, a display control section allows a display to display a setting item list of setting items lined up in a first direction and a first setting candidate list of setting candidates lined up in a second direction for one of the setting items, one list across the other, and provide, when a gesture receiving section receives a scroll gesture in the first direction via a touch panel, a scrolling display of the setting item list and a display of the first setting candidate list for the setting item presented in an intersecting region thereof with the setting item list, and provide, when the gesture receiving section receives a scroll gesture in the second direction via the touch panel, a scrolling display of the first setting candidate list. A setting receiving section receives as a changed setting the setting candidate presented in the intersecting region.

3 Claims, 17 Drawing Sheets

(51) Int. Cl.
*G06F 3/041* (2006.01)
*G03G 15/00* (2006.01)
*G06F 3/0485* (2013.01)
*G06F 3/0484* (2013.01)
*H04N 1/00* (2006.01)

(52) U.S. Cl.
CPC ..... *H04N 1/00411* (2013.01); *H04N 1/00421* (2013.01); *G06F 3/0484* (2013.01); *G06F 3/0485* (2013.01); *H04N 1/00392* (2013.01); *H04N 2201/0094* (2013.01)

(58) Field of Classification Search
USPC ............... 715/702, 757, 765, 769, 784, 863; 358/1.15
See application file for complete search history.

(56) References Cited

U.S. PATENT DOCUMENTS

| | | | |
|---|---|---|---|
| 7,812,824 | B2 | 10/2010 | Im et al. |
| 8,239,894 | B2 | 8/2012 | Utsuki et al. |
| 8,593,484 | B2 | 11/2013 | Sakurai |
| 9,123,385 | B2 | 9/2015 | Isozu et al. |
| 2004/0233238 | A1 | 11/2004 | Lahdesmaki |
| 2006/0020970 | A1 | 1/2006 | Utsuki et al. |
| 2007/0152981 | A1 | 7/2007 | Im et al. |
| 2007/0165012 | A1 | 7/2007 | Koda |
| 2009/0109224 | A1 | 4/2009 | Sakurai |
| 2009/0254842 | A1* | 10/2009 | Leacock ............ H04L 12/1827 715/757 |
| 2010/0290085 | A1* | 11/2010 | Okada ................ H04N 1/00222 358/1.15 |
| 2011/0202837 | A1* | 8/2011 | Fong .................... G06F 3/0485 715/702 |
| 2011/0209077 | A1* | 8/2011 | Matsuura ........... H04N 1/00416 715/765 |
| 2012/0110509 | A1 | 5/2012 | Isozu et al. |
| 2012/0137236 | A1 | 5/2012 | Abe et al. |
| 2015/0143282 | A1* | 5/2015 | Telang ................. G06F 3/0487 715/784 |
| 2015/0370418 | A1* | 12/2015 | Kawanaka ........ G06F 17/30274 715/769 |

FOREIGN PATENT DOCUMENTS

| | | |
|---|---|---|
| EP | 2 447 946 A2 | 5/2012 |
| JP | 2006031115 A | 2/2006 |
| JP | 2007-172024 A | 7/2007 |
| JP | 2007183914 A | 7/2007 |
| JP | 2009-111486 A | 5/2009 |
| JP | 2012095118 A | 5/2012 |
| JP | 2012129963 A | 7/2012 |
| JP | 2013-218522 A | 10/2013 |

OTHER PUBLICATIONS

Notice of Reasons for Refusal mailed by Japan Patent Office dated Jun. 14, 2016 in the corresponding Japanese patent application No. 2014-067633.

The first office action in CN mailed by SIPO (State Intellectual Property office) dated Jul. 31, 2017 in the corresponding Chinese Patent Application No. 201510125827.X.

* cited by examiner

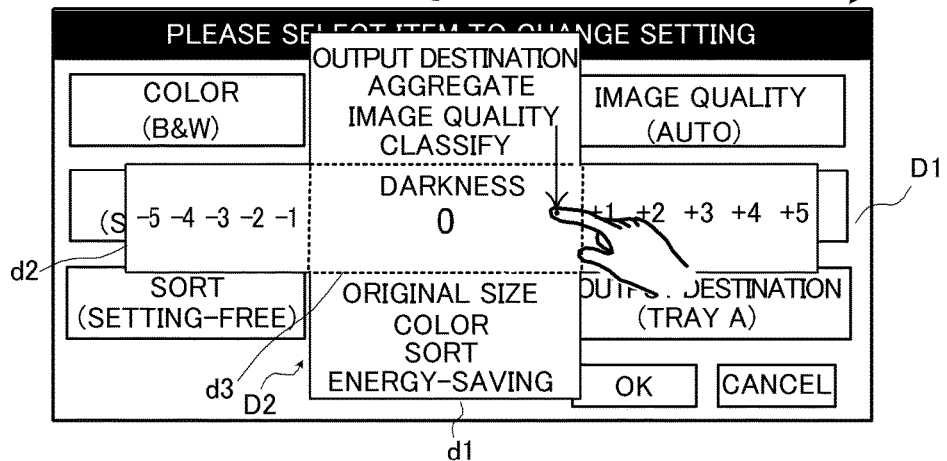
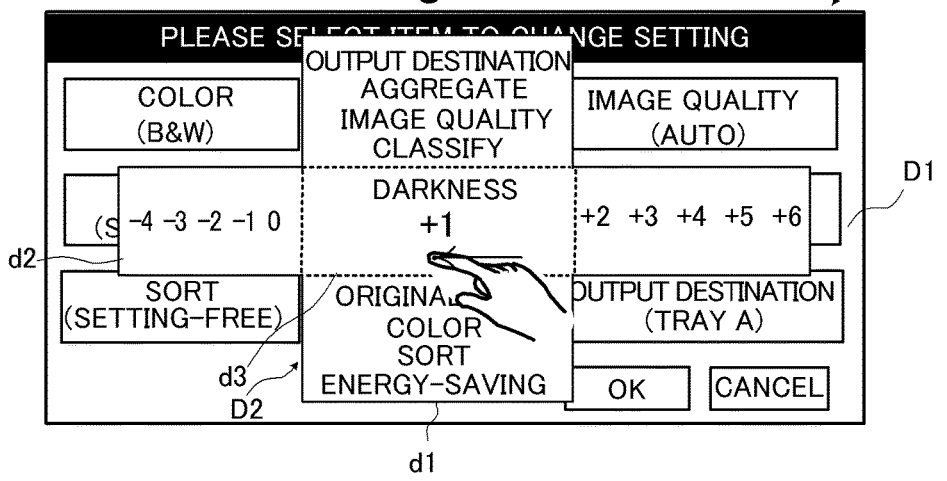
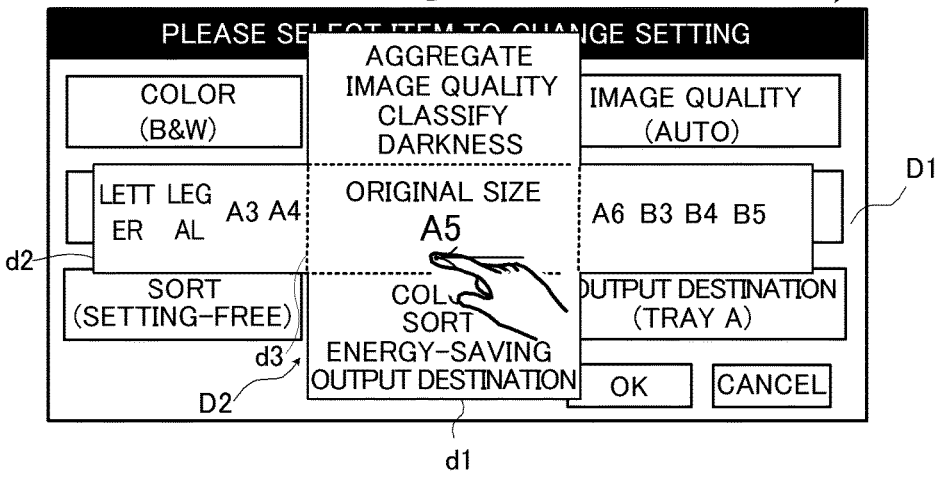

DISPLAY INPUT APPARATUS AND COMPUTER-READABLE NON-TRANSITORY RECORDING MEDIUM WITH DISPLAY INPUT CONTROL PROGRAM RECORDED THEREON

INCORPORATION BY REFERENCE

This application claims priority to Japanese Patent Application Nos. 2014-067633, 2014-067635, and 2014-067637 filed on Mar. 28, 2014, the entire disclosure of all of which are incorporated herein by reference.

BACKGROUND

The present disclosure relates to display input apparatuses and computer-readable non-transitory recording media with a display input control program recorded thereon and particularly relates to a technique for changing the settings of a plurality of setting items.

With the recent trend toward greater functionality of electronic equipment, there emerge image forming apparatuses, mobile terminals, such as smartphones, personal computers, and so on having a large number of user-settable setting items. These pieces of equipment are equipped with a display configured to display a setting item select screen on which a plurality of setting items are presented. When receiving a selection of one setting item on the setting item select screen, such equipment then displays a setting change screen on which candidates for the changeable setting of the selected setting item are presented, and receives a change of the setting based on a user's operation on the setting change screen. A technique is also known in which a touch panel is disposed in front of a display and each setting can be changed by more intuitive manipulation, such as by receiving a change of the setting via touch gestures on the touch panel.

SUMMARY

A technique improved over the aforementioned techniques is proposed as one aspect of the present disclosure.

A display input apparatus according to an aspect of the present disclosure includes a display, a touch panel, a gesture receiving section, a display control section, and a setting receiving section.

The touch panel is disposed in front of the display.

The gesture receiving section is configured to receive a user's gesture on the touch panel.

The display control section is configured to control a display operation of the display according to a user's gesture received by the gesture receiving section.

The setting receiving section is capable of receiving changes of settings of a plurality of setting items according to user's gestures received by the gesture receiving section.

The display control section allows the display to display a setting item list composed of the plurality of setting items lined up in a first direction and a first setting candidate list composed of a plurality of setting candidates listed for one of the plurality of setting items and lined up in a second direction different from the first direction, with the setting item list and the first setting candidate list across each other, allows, when the gesture receiving section receives a scroll gesture in the first direction, the display to provide a scrolling display of the setting item list and display the first setting candidate list composed of a plurality of setting candidates for the setting item presented in an intersecting region of the setting item list and the first setting candidate list by the scrolling display, and allows, when the gesture receiving section receives a scroll gesture in the second direction, the display to provide a scrolling display of the first setting candidate list.

The setting receiving section is configured to receive as a changed setting the setting candidate presented in the intersecting region of the setting item list and the first setting candidate list by the scroll gesture received by the gesture receiving section.

A computer-readable non-transitory recording medium according to another aspect of the present disclosure contains a display input control program recorded thereon.

The display input control program allows a computer to function as a gesture receiving section, a display control section, and a setting receiving section. The gesture receiving section is configured to receive a user's gesture on a touch panel. The display control section is configured to control a display operation of a display according to a user's gesture received by the gesture receiving section. The setting receiving section is capable of receiving changes of settings of a plurality of setting items according to user's gestures received by the gesture receiving section.

The display input control program further allows the computer to function so that the display control section allows the display to display a setting item list composed of the plurality of setting items lined up in a first direction and a setting candidate list composed of a plurality of setting candidates listed for one of the plurality of setting items and lined up in a second direction different from the first direction, with the setting item list and the setting candidate list across each other, allows, when the gesture receiving section receives a scroll gesture in the first direction, the display to provide a scrolling display of the setting item list and display the setting candidate list composed of a plurality of setting candidates for the setting item presented in an intersecting region of the setting item list and the setting candidate list by the scrolling display, and allows, when the gesture receiving section receives a scroll gesture in the second direction, the display to provide a scrolling display of the setting candidate list.

The display input control program further allows the computer to function so that the setting receiving section receives as a changed setting the setting candidate presented in the intersecting region of the setting item list and the setting candidate list by the scroll gesture received by the gesture receiving section.

BRIEF DESCRIPTION OF THE DRAWINGS

FIGS. 5A, 5B, and 5C show other display examples of the setting screen displayed on the display of the image forming apparatus according to Embodiment 1 of the present disclosure.

DETAILED DESCRIPTION

Hereinafter, a description will be given of a display input apparatus and a computer-readable non-transitory recording medium with a display input control program recorded thereon, both according to one embodiment of the present disclosure, with reference to the drawings.

<Embodiment 1>

Figure 1:
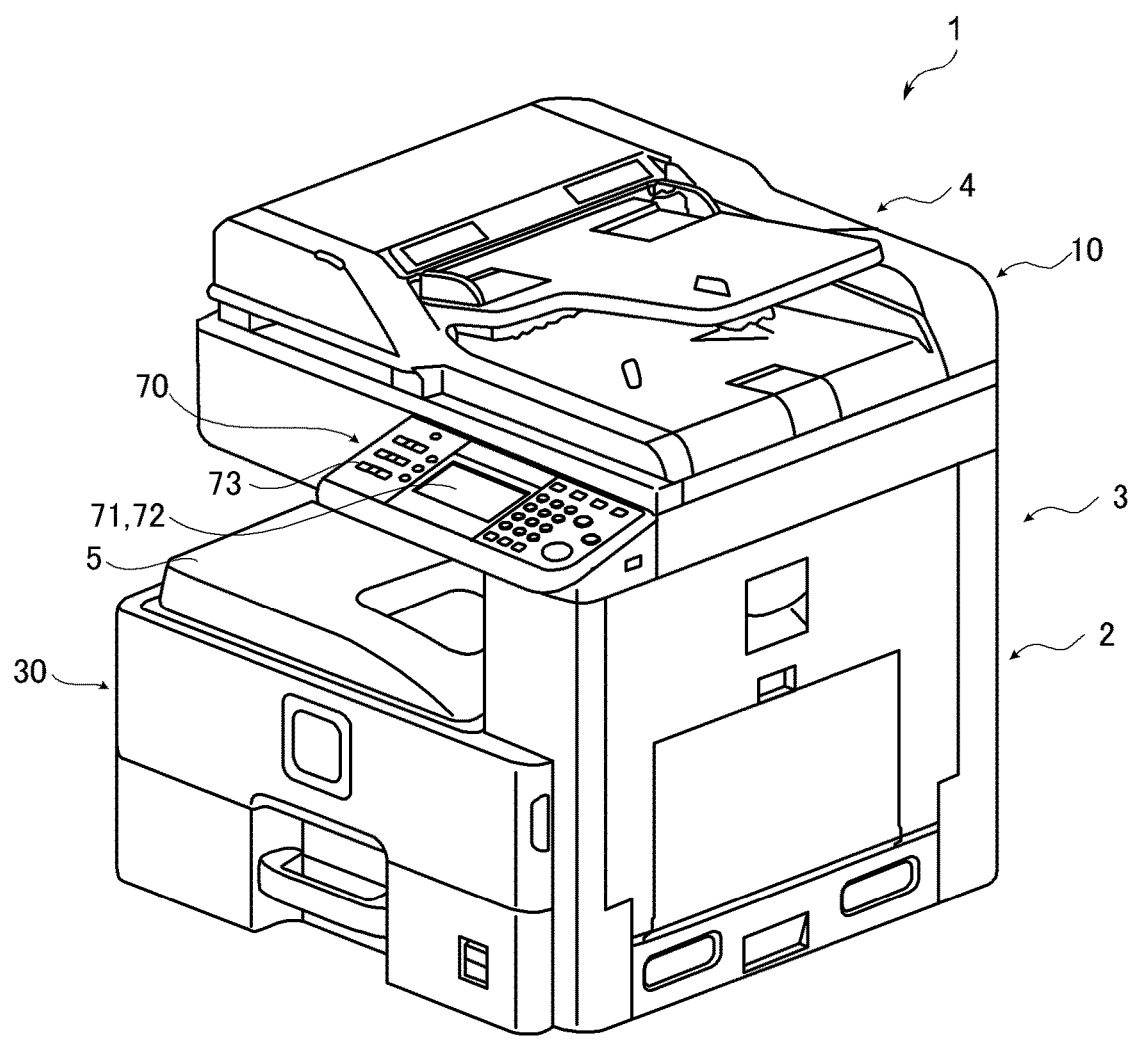
FIG. 1 is a perspective view showing the appearance of an image forming apparatus as an example of a display input apparatus according to Embodiment 1 of the present disclosure.
Figure 2:
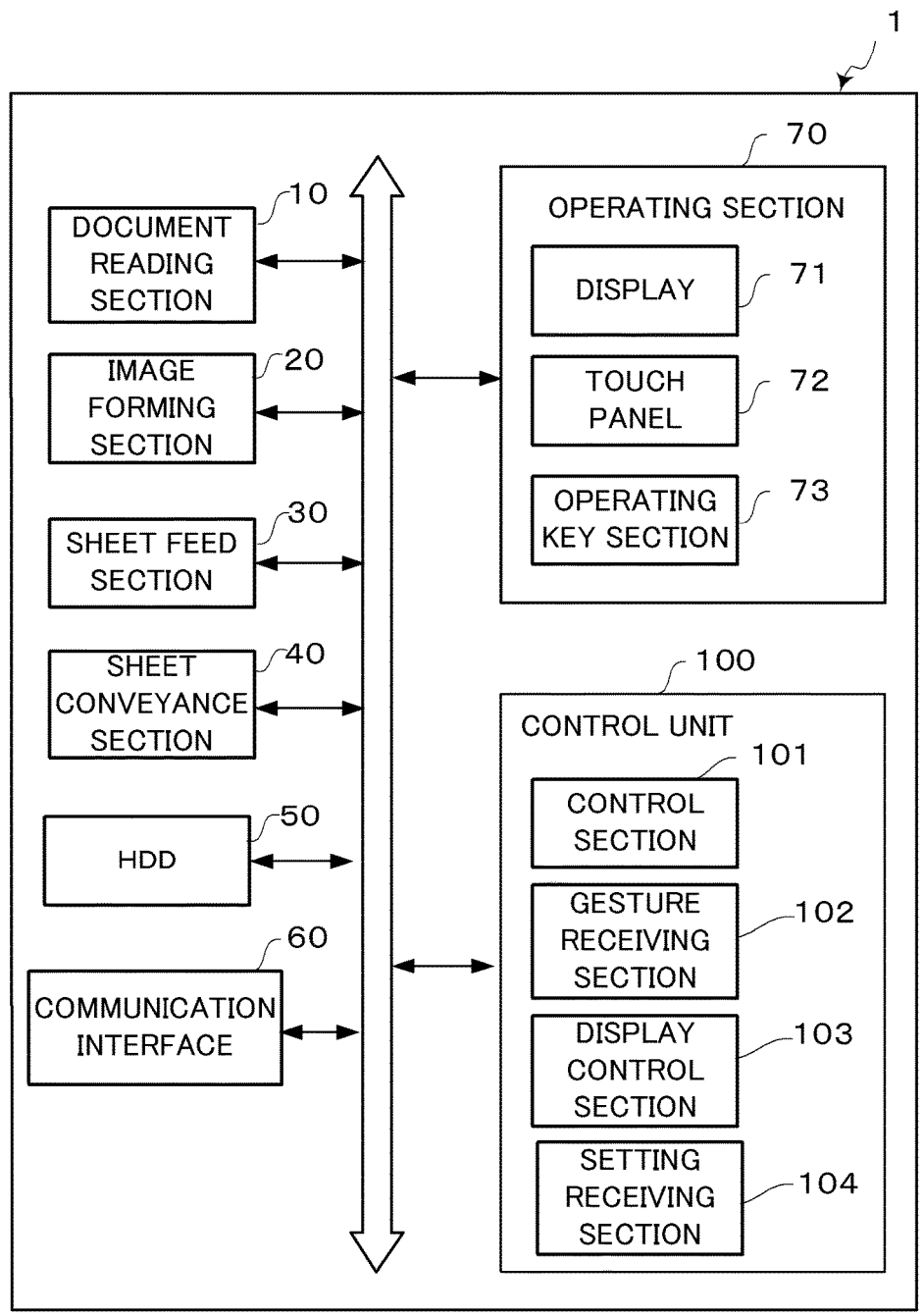
FIG. 2 is a functional block diagram showing an essential internal configuration of the image forming apparatus as an example of the display input apparatus according to Embodiment 1 of the present disclosure.

FIG. 1 is a perspective view showing the appearance of an image forming apparatus as an example of a display input apparatus according to Embodiment 1 of the present disclosure. FIG. 2 is a functional block diagram showing an essential internal configuration of the image forming apparatus as an example of the display input apparatus according to Embodiment 1 of the present disclosure.

The image forming apparatus 1 is a multifunction peripheral having multiple functions including, for example, a copy function, a print function, a scan function, and a facsimile function. As shown in FIG. 1, the image forming apparatus 1 is roughly composed of an apparatus body 2, a document reading section 10 disposed above the apparatus body 2, and a connecting portion 3 provided between the document reading section 10 and the apparatus body 2.

In a document reading operation of the image forming apparatus 1, the document reading section 10 optically reads an original document being fed from a document feed section 4 or an original document placed on an unshown original glass plate to generate image data. The image data generated by the document reading section 10 is stored on an internal HDD, a network-connected computer or the like.

In an image forming operation of the image forming apparatus 1, an image forming section 20 forms a toner image on an unshown photosensitive drum through charging, exposure, and developing processes based on image data generated by the document reading operation or image data stored on the internal HDD. A paper sheet fed from a sheet feed section 30 is conveyed, along a sheet conveyance path formed inside the image forming apparatus 1, by a sheet conveyance section 40 and the toner image is transferred to the paper sheet at a predetermined location in the interior of the image forming apparatus 1. Thereafter, the paper sheet is subjected to fixation processing and then discharged to a sheet output tray 5.

The image forming apparatus 1 includes, in addition to the aforementioned document reading section 10, image forming section 20, sheet feed section 30, and sheet conveyance section 40, an HDD 50, a communication interface 60, an operating section 70, a control unit 100, and so on.

The HDD 50 is a large storage device and can store image data read by the document reading section 10 and changed settings received by a hereinafter described setting receiving section 104 of the control unit 100.

The communication interface 60 includes a communication module, such as a LAN chip, and is configured to provide data communication with other image forming apparatuses, personal computers and so on connected via a network.

The operating section 70 includes a display 71, a touch panel 72, and an operating key section 73.

The display 71 is formed of a liquid crystal display (LCD) or an organic light-emitting diode (OLED) display. The display 71 is configured to display, under the control of a hereinafter described display control section 103 of the control unit 100, a setting item list composed of a plurality of setting items lined up therein, a setting candidate list composed of setting candidates lined up for a changeable setting, and so on.

The touch panel 72 is a touch panel of, for example, a so-called resistive film system or a capacitance system. The touch panel 72 is disposed in front of the display 71 and configured to detect a user's touch of the display screen of the display 71 together with the point of touch. When detecting the user's touch, the touch panel 72 outputs a detection signal indicating a coordinate point of the point of touch to a hereinafter described gesture receiving section 102 and so on of the control unit 100. The touch panel 72 encompasses a touch panel operable to detect a user's finger or the like when the user's finger or the like, even if not directly touching the display screen, comes within a certain small distance of the display screen. Therefore, the term "touch" used in this embodiment includes a state where a finger or the like coming within the certain small distance of the display screen is detected, without a direct touch of the display screen, by the function of the touch panel 72, with the consideration of this state as a substantial touch.

The operating key section 73 includes, for example, a menu key for calling up a menu, arrow keys for moving the focus of a GUI forming the menu, a determination key for performing a determination operation for the GUI forming the menu, numerical keys, and so on and is configured to receive various user's operations for a setting menu displayed on the display 71.

The control unit 100 is composed of a CPU (central processing unit), a RAM (random access memory), a ROM (read only memory), and so on. When a display input control program stored in the above ROM or on the HDD 50 is executed by the above CPU, the control unit 100 functions as a control section 101, the gesture receiving section 102, the display control section 103, and the setting receiving section 104. Alternatively, each of the control section 101, the gesture receiving section 102, the display control section 103, and the setting receiving section 104 of the control unit 100 may not be implemented by the operation of the control unit 100 in accordance with the display input control program but may be constituted by a hardware circuit.

The control section 101 governs the overall operation control of the image forming apparatus 1. For example, the control section 101 controls, based on the settings stored on the HDD 50, the image forming section 20, the sheet feed section 30, the sheet conveyance section 40, and so on to allow the formation of a user's desired image on a paper sheet.

The gesture receiving section 102 is configured to identify, based on the detection signal output from the touch panel 72, a user's gesture input by the user. Then, the gesture receiving section 102 receives the identified user's gesture and outputs a control signal corresponding to the user's gesture to the display control section 103, the setting receiving section 104, and so on.

The term user's gesture herein includes a scroll gesture (referred to also as a swipe gesture), a touch gesture, and a pinch gesture. For example, when the user slides his/her finger on the display screen while keeping it in touch with the touch panel 72, the touch panel 72 outputs to the gesture receiving section 102 detection signals indicating a series of points of movement from an initial point at which the touch has been first detected to a last point at which the touch is last detected. Based on the detection signals output from the touch panel 72, the gesture receiving section 102 identifies the user's gesture input by the user as a scroll gesture. Then, the gesture receiving section 102 outputs a control signal corresponding to the scroll gesture to the display control section 103, the setting receiving section 104, and so on.

The display control section 103 has the function of controlling the display operation of the display 71 according to the user's gesture received by the gesture receiving section 102. For example, when the gesture receiving section 102 receives a scroll gesture, the display control section 103 allows, according to the scroll gesture, the display 71 to provide a scrolling display of an image displayed thereon.

The image forming apparatus 1 has a setting change mode in which the settings of a plurality of setting items are changed. In the setting change mode, the display control section 103 allows the display 71 to display a predetermined setting screen.

Figure 3A:
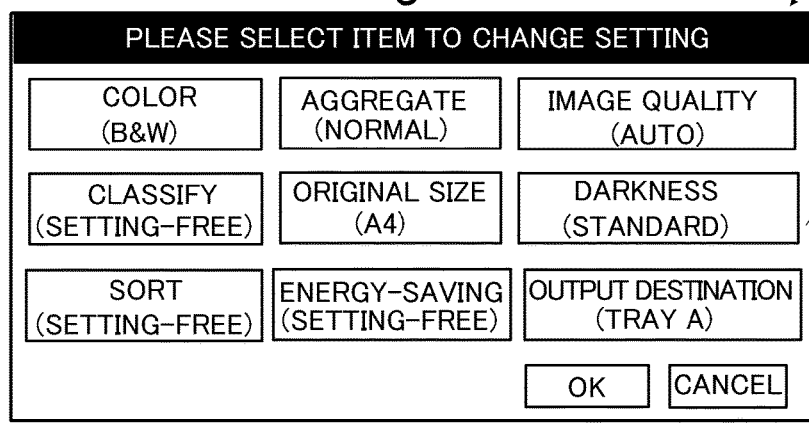
FIGS. 3A, 3B, and 3C show display examples of a setting screen displayed on a display of the image forming apparatus according to Embodiment 1 of the present disclosure.
Figure 3B:
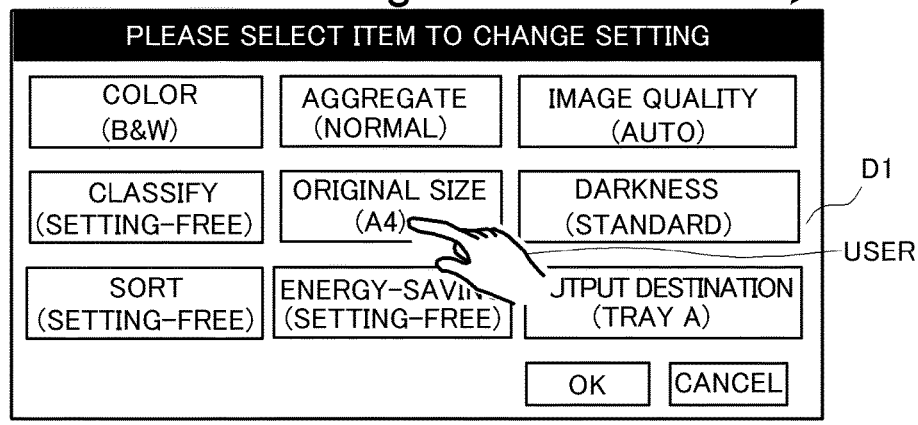
Figure 3C:
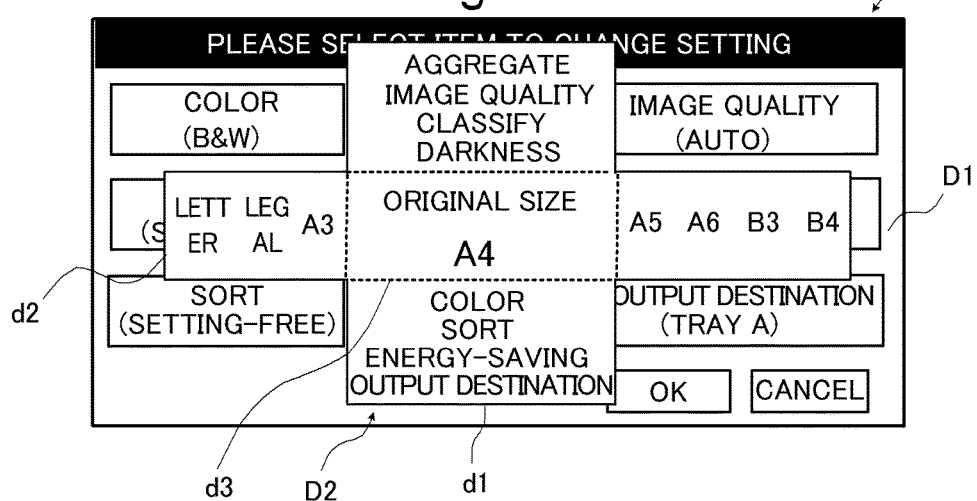

FIGS. 3A to 3C show display examples of a setting screen displayed on the display 71 of the image forming apparatus 1 according to Embodiment 1 of the present disclosure. As shown in FIG. 3A, the display control section 103 allows the display 71 to display a setting screen D1 presenting a table of a plurality of setting items whose settings can be changed on the image forming apparatus 1. In the example shown in FIG. 3A, the current settings of the setting items are displayed together with their setting items.

When, as shown in FIG. 3B, the gesture receiving section 102 receives a selection of one of the plurality of setting items via a touch gesture, the display control section 103 allows the display 71 to user-visibly display, in the center of the display 71, a setting window D2 for the selected setting item by overlaying the setting window D2 on the setting screen D1 (see FIG. 3C). In this case, the setting window D2 is formed by arranging a setting item list d1 composed of a plurality of setting items lined up in a first direction (vertical direction in the example shown in FIG. 3C) and a setting candidate list d2 (first setting candidate list) composed of a plurality of setting candidates listed for the selected one of the plurality of setting items and lined up in a second direction (horizontal direction in the example shown in FIG. 3C) different from the first direction, one list across the other. The display control section 103 is configured to allow the display 71 to provide, with the setting window D2 displayed, respective scrolling displays of the setting item list d1 and the setting candidate list d2 according to their respective scroll gestures received by the gesture receiving section 102.

The setting receiving section 104 is capable of receiving changes of the settings of the plurality of setting items according to user's gestures received by the gesture receiving section 102 and allows the HDD 50 to save the changed settings.

Figure 4:
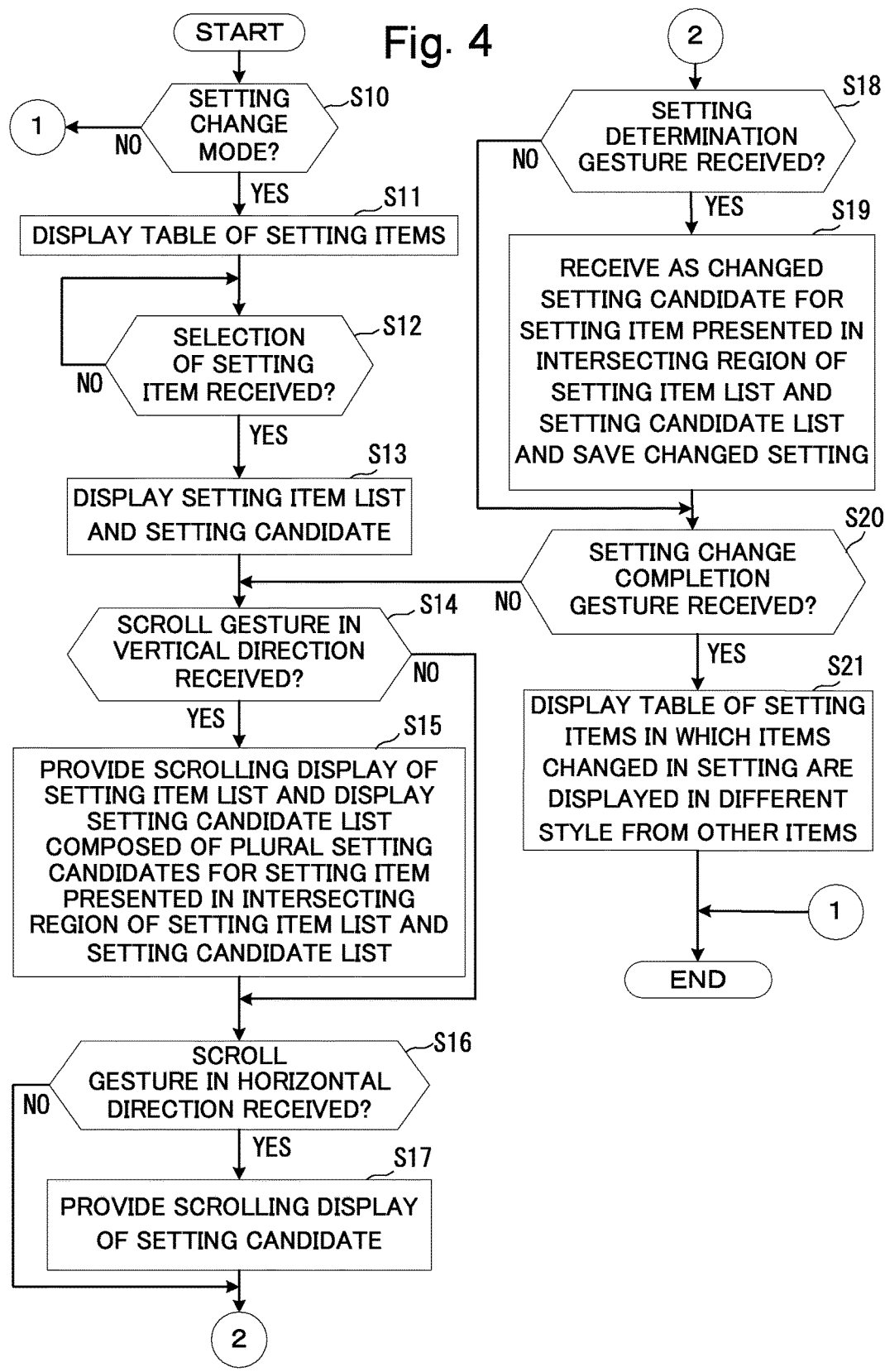
FIG. 4 is a flowchart showing a processing flow of the image forming apparatus according to Embodiment 1 of the present disclosure.
Figure 6:
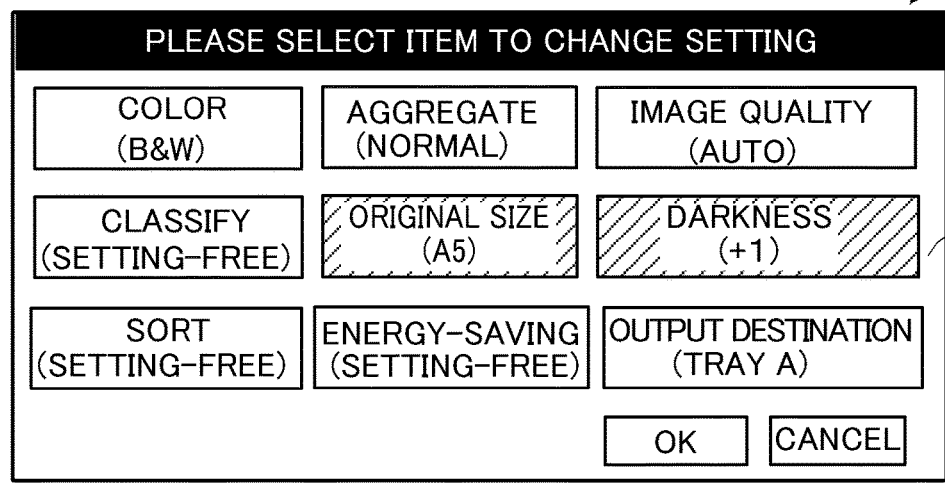
FIG. 6 shows another display example of the setting screen displayed on the display of the image forming apparatus according to Embodiment 1 of the present disclosure.

Next, a description will be given of the operation of the image forming apparatus 1 having the aforementioned configuration. FIG. 4 is a flowchart showing a processing flow of the image forming apparatus 1 according to Embodiment 1 of the present disclosure. FIGS. 5A to 5C and FIG. 6 show other display examples of the setting screen displayed on the display 71 of the image forming apparatus 1 according to Embodiment 1 of the present disclosure.

The control section 101 of the image forming apparatus 1 first determines whether or not the image forming apparatus 1 transitions to a setting change mode in which the settings of the plurality of setting items are changed (step S10). If a button for transition to the setting change mode is presented on the display 71, the image forming apparatus 1 can transition to the setting change mode when the gesture receiving section 102 receives a touch gesture consisting of a touch of the location on the touch panel 72 just above the button presented. Alternatively, if a dedicated key for calling up the setting change mode is provided in the operating key section 73, the image forming apparatus 1 can transition to the setting change mode at the push of the dedicated key.

Upon transition to the setting change mode (YES in step S10), as shown in FIG. 3A, the display control section 103 allows the display 71 to display the setting screen D1 presenting a table of a plurality of setting items whose settings can be changed on the image forming apparatus 1 (step S11).

Then, the display control section 103 determines, with the setting screen D1 displayed, whether or not the gesture receiving section 102 has received a selection of one of the plurality of setting items via a touch gesture (step S12).

If a selection of one setting item has been received (YES in step S12), the display control section 103 allows the display 71 to user-visibly display a setting window D2 for the selected setting item by overlaying the setting window D2 on the setting screen D1 (step S13). At this time, the display control section 103 allows the display 71 to present, in an intersecting region d3 of the setting item list d1 and the setting candidate list d2, the setting item the selection of which has been received in step S12. Furthermore, the display control section 103 allows the display 71 to present, in the setting candidate list d2, a plurality of setting candidates for the setting item presented in the intersecting region d3 of the setting item list d1 and the setting candidate list d2. Since, in the example shown in FIGS. 3B and 3C, "ORIGINAL SIZE" is selected as the setting item, a plurality of candidates, such as "A3", "A4", and "B3", for the changeable setting of the setting item "ORIGINAL SIZE" are presented in the setting candidate list d2. In addition, "A4", which is the current setting of the setting item "ORIGINAL SIZE", is presented in the intersecting region d3 of the setting item list d1 and the setting candidate list d2.

Then, the display control section 103 determines, with the setting window D2 displayed, whether or not the gesture receiving section 102 has received a scroll gesture in a vertical direction (step S14).

If the scroll gesture in the vertical direction has been received (YES in step S14), the display control section 103 allows the display 71 to provide a scrolling display of the setting item list d1 and present, in the setting candidate list d2, a plurality of setting candidates for the setting item presented in the intersecting region d3 of the setting item list d1 and the setting candidate list d2 by the scrolling display (step S15). In the example shown in FIG. 5A, a scroll gesture in a vertical direction from the state shown in FIG. 3C has been received and a scrolling display of the setting item list d1 is thus provided, so that the setting item "DARKNESS" is presented in the intersecting region d3 of the setting item list d1 and the setting candidate list d2. In this case, the setting candidates presented in the setting candidate list d2 are changed from those for the setting item "ORIGINAL SIZE" to those for the setting item "DARKNESS".

Furthermore, the display control section 103 determines, with the setting window D2 displayed, whether or not the gesture receiving section 102 has received a scroll gesture in a horizontal direction (step S16).

If the scroll gesture in the horizontal direction has been received (YES in step S16), the display control section 103 allows the display 71 to provide a scrolling display of the setting candidate list d2 (step S17). In the example shown in FIG. 5B, a scroll gesture in a horizontal direction from the state shown in FIG. 5A has been received and a scrolling display of the setting candidate list d2 is thus provided, so that "+1" is presented as a setting candidate for the setting item "DARKNESS" in the intersecting region d3 of the setting item list d1 and the setting candidate list d2. In the example shown in FIG. 5C, a scroll gesture in a horizontal direction from the state shown in FIG. 3C has been received and a scrolling display of the setting candidate list d2 is thus provided, so that "A5" is presented as a setting candidate for the setting item "ORIGINAL SIZE" in the intersecting region d3 of the setting item list d1 and the setting candidate list d2.

Furthermore, during the scrolling display of the setting item list d1 or the setting candidate list d2, the display control section 103 allows the display 71 to cyclically display setting items or setting candidates. In the example shown in FIG. 3C, the setting item "AGGREGATE" is presented at the top of the setting item list d1 and the setting item "OUTPUT DESTINATION" is presented at the bottom of the setting item list d1. Then, upon receipt of a scroll gesture in a vertical direction from the above state, the setting items of the setting item list d1 are cyclically displayed, so that as shown in FIG. 5A the setting item "OUTPUT DESTINATION" is presented at the top of the setting item list d1.

Then, the display control section 103 determines whether or not the gesture receiving section 102 has received a predetermined setting determination gesture (step S18). The predetermined setting determination gesture is, for example, a gesture of two touches anywhere on the display region of the touch panel 72 within a predetermined period of time (a double-touch gesture).

If the setting determination gesture has been received (YES in step S18), the setting receiving section 104 receives as a changed setting the setting candidate for the setting item being presented in the intersecting region d3 of the setting item list d1 and the setting candidate list d2 at the point in time and allows the HDD 50 to save the changed setting (step S19).

The above description in this embodiment has been given of the case where when the gesture receiving section 102 receives a predetermined setting determination gesture, the setting receiving section 104 receives as a changed setting the setting candidate for the setting item being presented in the intersecting region d3 of the setting item list d1 and the setting candidate list d2 at the point in time. However, the present disclosure is not necessarily limited to this case. Even without any special gesture, such as a double-touch gesture, the setting receiving section 104 may, when a predetermined period of time passes since the setting of the setting item presented in the intersecting region d3 of the setting item list d1 and the setting candidate list d2 has been changed to a setting candidate by a scroll gesture, receive the setting candidate as a changed setting.

After the processing in step S19, the display control section 103 determines whether or not the gesture receiving section 102 has received a predetermined setting change completion gesture (step S20). The predetermined setting change completion gesture is, for example, a gesture of a touch anywhere on a region of the touch panel 72 outside the setting window D2.

If no setting change completion gesture has been received (NO in step S20), the process returns to step S14. On the other hand, if a setting change completion gesture has been received (YES in step S20), the display control section 103 allows the display 71 to display the setting screen D1 presenting the table of setting items so that the setting items whose settings have been changed have a different display style from the other setting items (step S21). Thus, the user can be notified, in an easily understandable manner, of the setting items whose settings have been changed by the scroll gestures in the vertical and horizontal directions. In the example shown in FIG. 6, the setting "A4" of the setting item "ORIGINAL SIZE" and the setting "0" of the setting item "DARKNESS" in the state shown in FIG. 3A are changed to the settings "A5" and "+1", respectively.

As thus far described, the display input apparatus according to Embodiment 1 of the present disclosure includes the display 71, the touch panel 72 disposed in front of the display 71, the gesture receiving section 102 configured to receive a user's gesture on the touch panel 72, the display control section 103 configured to control the display operation of the display 71 according to a user's gesture received by the gesture receiving section 102, and the setting receiving section 104 capable of receiving changes of the settings of a plurality of setting items according to user's gestures received by the gesture receiving section 102. Furthermore, the display control section 103 allows the display 71 to display the setting item list d1 composed of a plurality of setting items lined up in a first direction and the setting candidate list d2 composed of a plurality of setting candidates listed for one of the plurality of setting items and lined up in a second direction different from the first direction, with the setting item list d1 and the setting candidate list d2 across each other. The display control section 103 allows, when the gesture receiving section 102 receives a scroll gesture in the first direction, the display 71 to provide a scrolling display of the setting item list d1 and display the setting candidate list d2 composed of a plurality of setting candidates for the setting item presented in the intersecting region d3 of the setting item list d1 and the setting candidate list d2 by the scrolling display and allows, when the gesture receiving section 102 receives a scroll gesture in the second direction, the display 71 to provide a scrolling display of the setting candidate list d2. Moreover, the setting receiving section 104 is configured to receive as a changed setting the setting candidate presented in the intersecting region d3 of the setting item list d1 and the setting candidate region d2 by the scroll gesture received by the gesture receiving section 102.

If, in general display input apparatuses, a change of the setting of one setting item is followed by a change of the setting of a second setting item, the display must return to and display an initial setting item select screen and then the desired second setting item must be selected on the setting item select screen. In order to change the settings of a plurality of setting items, it is necessary to move back and forth between the setting item select screen and the setting change screen, which is operationally troublesome and user-unfriendly.

In contrast, according to the above configuration, the changes of the settings of a plurality of setting items can be received on a single setting screen. Even if a change of the setting of one setting item is followed by a change of the setting of a second setting item, neither return of the display to an initial setting item select screen nor selection of the desired second setting item on the setting item select screen is necessary but the settings of these setting items can be changed on the same setting screen, which is highly user-friendly. Furthermore, the manipulation required for the user to change the settings of a plurality of setting items is only intuitive manipulation consisting of scroll gestures in two directions and therefore the settings of the plurality of setting items can be changed with simpler manipulation than before.

(Supplement 1)

Although the description in Embodiment 1 has been given of the case where, as shown in FIGS. 3B and 3C, when a selection of a setting item is received via a touch gesture, the setting window D2 for the selected setting item is user-visibly displayed in the center of the display 71 by overlaying the setting window D2 on the setting screen D1, the present disclosure is not necessarily limited to this case.

Figure 7A:
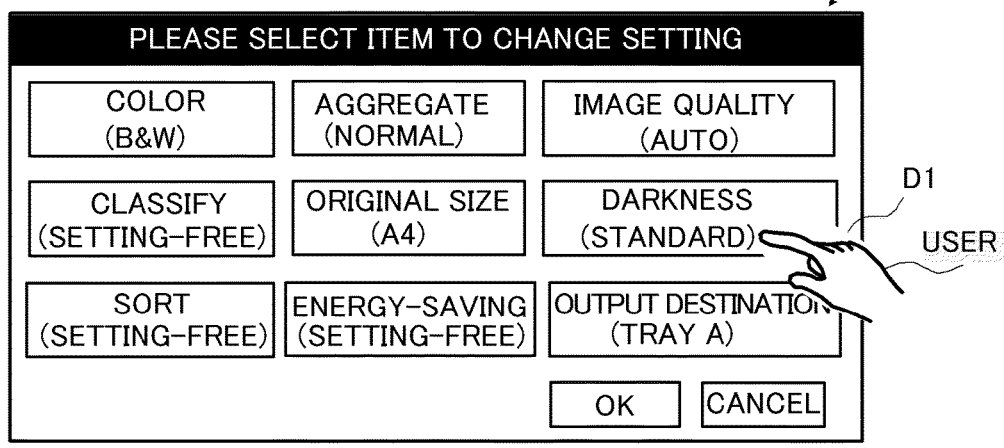
FIGS. 7A and 7B show display examples of a setting screen displayed on a display of an image forming apparatus according to Supplement 1.
Figure 7B:
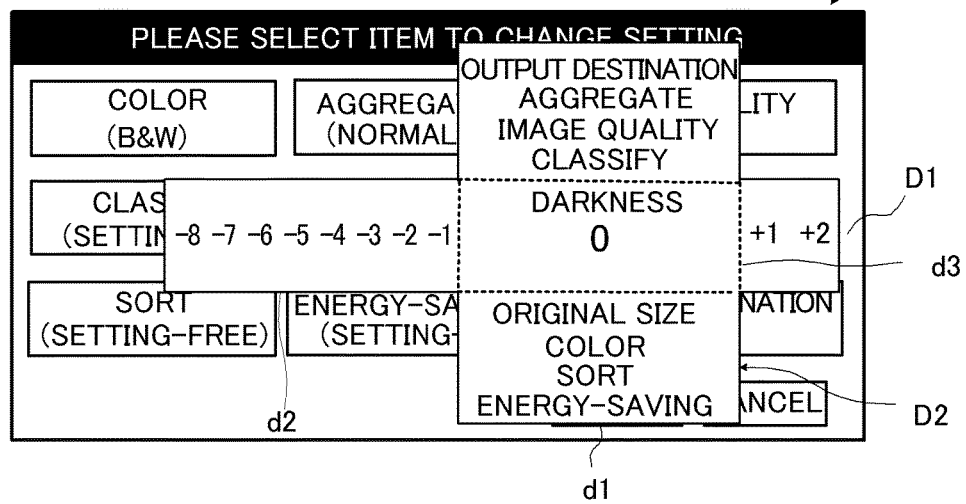

FIGS. 7A and 7B show display examples of a setting screen displayed on the display 71 of the image forming apparatus 1 according to Supplement 1. In the example shown in FIG. 7A, the gesture receiving section 102 receives a selection of the setting item "DARKNESS" from among a plurality of setting items via a touch gesture. At this time, the display control section 103 allows the display 71 to display a setting window D2 for the selected setting item, on top of a location on the setting screen D1 where the selected setting item "DARKNESS" is presented, by arranging a setting item list d1 and a setting candidate list d2 across each other (see FIG. 7B). Since an intersecting region d3 of the setting item list d1 and the setting candidate list d2 is presented at a user's touch point on the display 71, there is no need to lift his/her finger off the display 71 after the touch gesture and the setting of the selected setting item can be changed by a scroll gesture starting from the touch point, which is highly user-friendly.

(Supplement 2)

Although the description in Embodiment 1 has been given of the case where, as shown in FIGS. 5A to 5C, an approximately cross-shaped setting window D2 composed of the setting item list d1 and the setting candidate list d2 is displayed on the display 71, the present disclosure is not necessarily limited to this case.

Figure 8A:
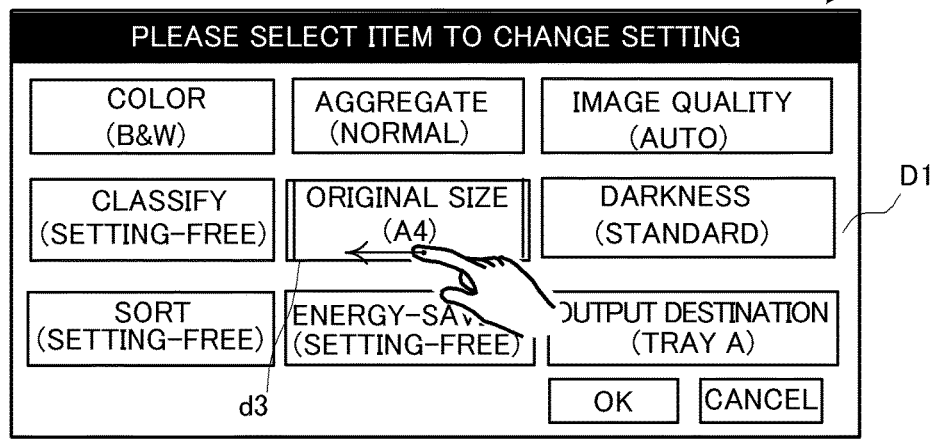
FIGS. 8A, 8B, and 8C show display examples of a setting screen displayed on a display of an image forming apparatus according to Supplement 2.
Figure 8B:
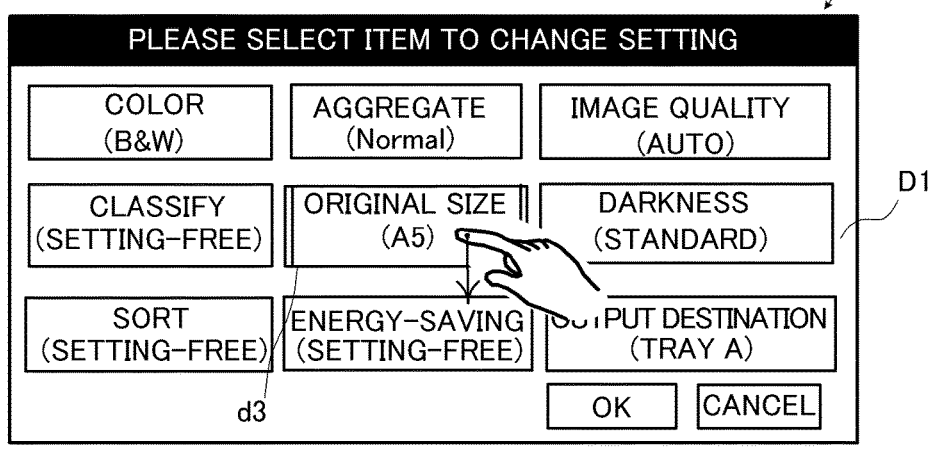
Figure 8C:
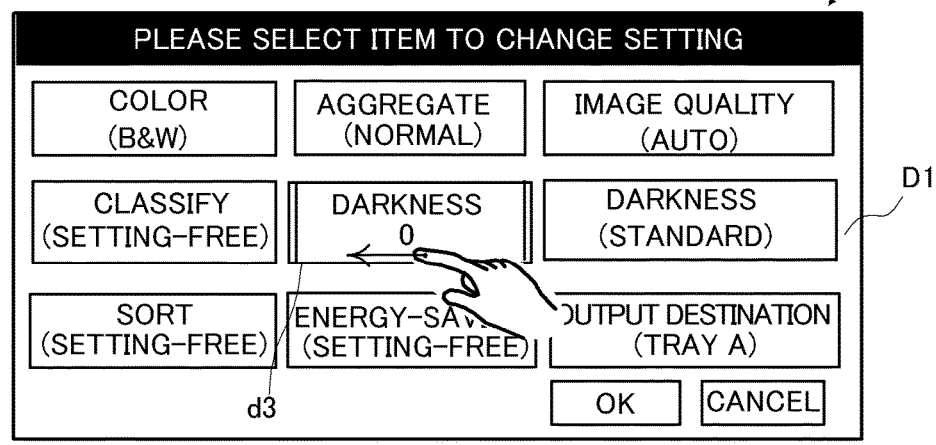

FIGS. 8A to 8C show display examples of a setting screen displayed on the display 71 of the image forming apparatus 1 according to Supplement 2. When, as shown in FIG. 3B, the gesture receiving section 102 receives a selection of one of a plurality of setting items via a touch gesture, the display control section 103 may not allow the display 71 to user-visibly display the setting window D2 by overlaying the entire setting window D2 on the setting screen D1 as shown in FIG. 3C but may allow the display 71 to present only the intersecting region d3 of the setting item list d1 and the setting candidate list d2 as shown in FIGS. 8A to 8C.

For example, when as shown in FIG. 3B the gesture receiving section 102 receives a selection of the setting item "ORIGINAL SIZE" via a touch gesture, the display control section 103 allows the display 71 to present the setting item "ORIGINAL SIZE" and a current setting "A4" in the region d3 as shown in FIG. 8A. When in this state the gesture receiving section 102 receives a scroll gesture in a horizontal direction, the display control section 103 allows the display 71 to present setting candidates for "ORIGINAL SIZE" one by one, one after another, in the region d3. Then, when the gesture receiving section 102 receives a setting determination gesture, the setting receiving section 104 receives as a changed setting the setting candidate for the setting item being presented in the region d3 at the point in time.

For another example, when as shown in FIG. 8B the gesture receiving section 102 receives a scroll gesture in a vertical direction, the display control section 103 allows the display 71 to display the setting items one by one, one after another, in the region d3 (see FIG. 8C). The user can change the setting of a desired setting item by continuing the scroll gesture in the vertical direction until the desired setting item appears in the region d3 and then making a scroll gesture in a horizontal direction.

<Embodiment 2>

Figure 9:
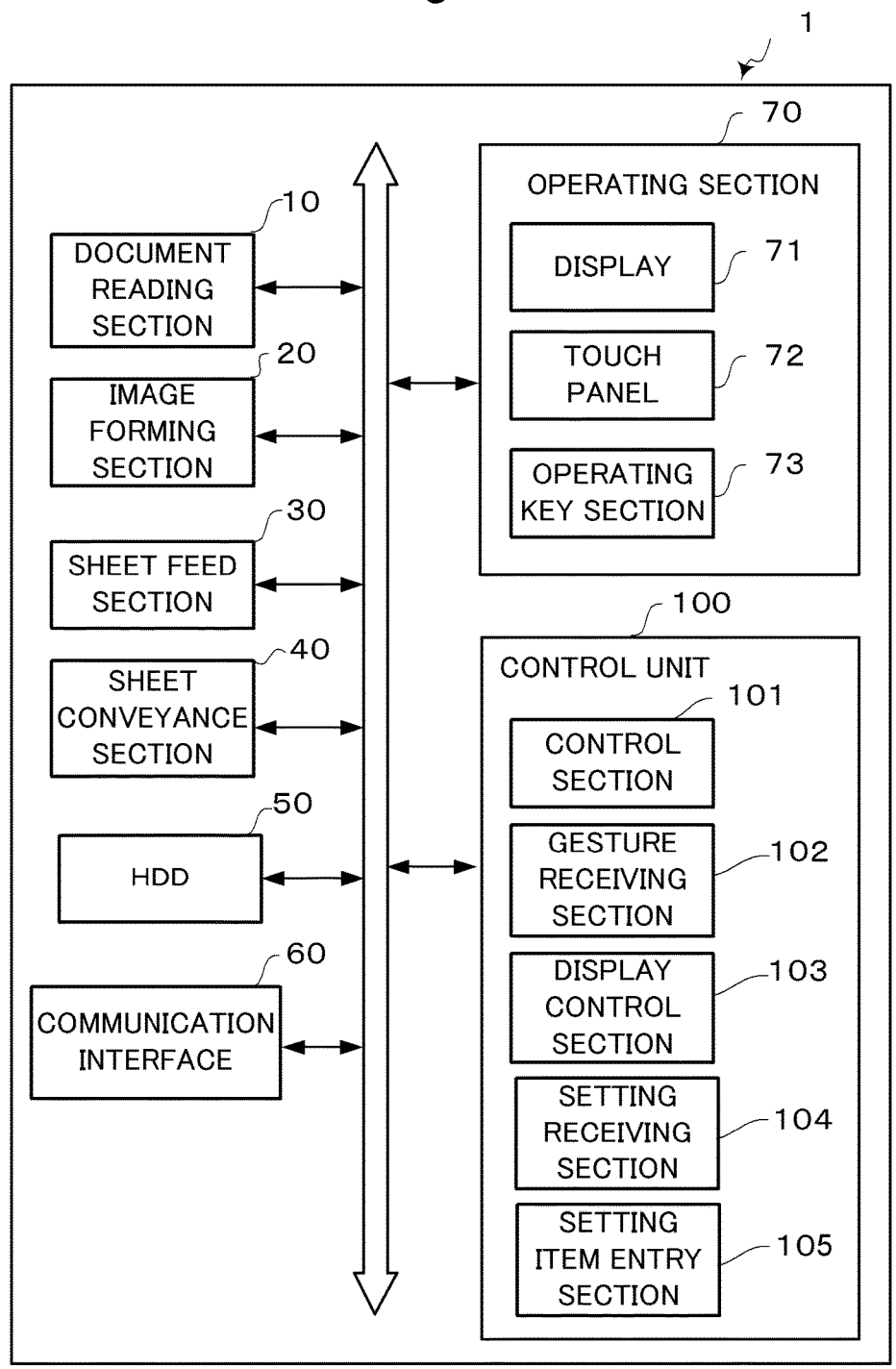
FIG. 9 is a functional block diagram showing an essential internal configuration of an image forming apparatus as an example of a display input apparatus according to Embodiment 2 of the present disclosure.

FIG. 9 is a functional block diagram showing an essential internal configuration of an image forming apparatus as an example of a display input apparatus according to Embodiment 2 of the present disclosure.

A control unit 100 of an image forming apparatus 1 according to Embodiment 2 of the present disclosure functions not only as the aforementioned sections described in Embodiment 1 but also as a setting item entry section 105 when a display input control program stored in its internal ROM or on an HDD 50 is executed by its internal CPU. The setting item entry section 105 is configured to receive a selection of a particular setting item from among a plurality of setting items according to a user's gesture received by the gesture receiving section 102.

Figure 10A:
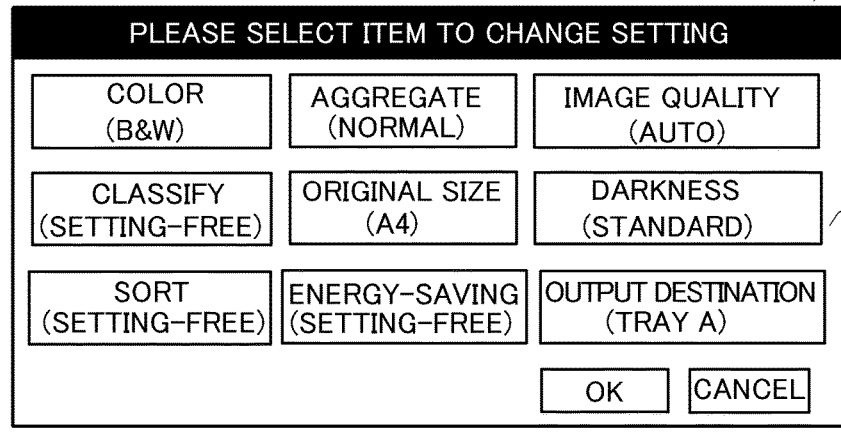
FIGS. 10A, 10B, and 10C show display examples of a setting screen displayed on a display of the image forming apparatus according to Embodiment 2 of the present disclosure.
Figure 10B:
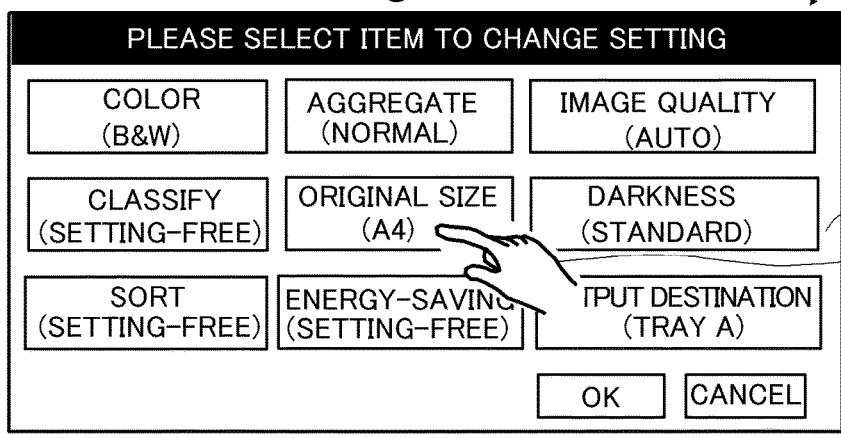
Figure 10C:
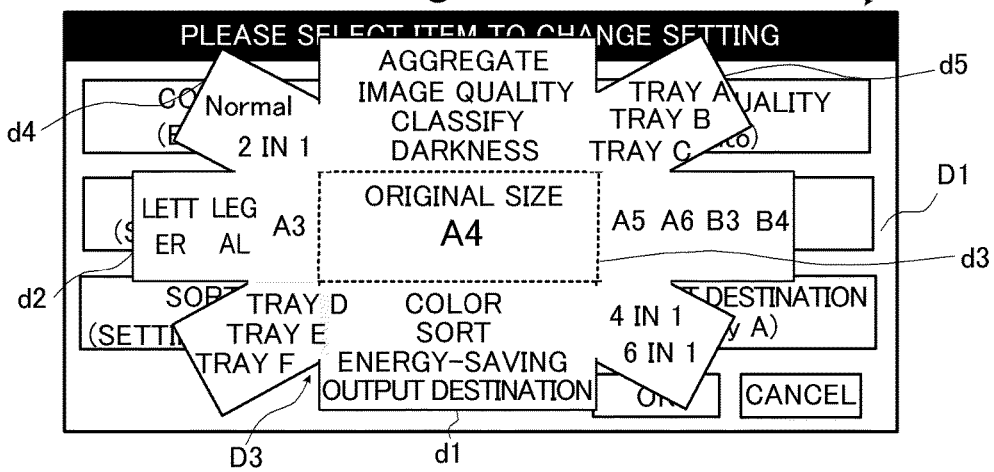

FIGS. 10A to 10C show display examples of a setting screen displayed on a display 71 of the image forming apparatus 1 according to Embodiment 2.

FIGS. 10A and 10B show the same setting screen D1 as displayed on the display 71 of the image forming apparatus 1 according to Embodiment 1 shown in FIGS. 3A and 3B. When, as shown in FIG. 10B, the gesture receiving section 102 receives a selection of one of the plurality of setting items via a touch gesture, the display control section 103 allows the display 71 to user-visibly display, in the center of the display 71, a setting window D3 for the selected setting item by overlaying the setting window D3 on the setting screen D1 (see FIG. 10C). In this case, the setting window D3 is formed by arranging not only a setting item list d1 composed of a plurality of setting items lined up in a first direction (vertical direction in the example shown in FIG. 10C) and a first setting candidate list d2 composed of a plurality of setting candidates listed for the selected one of the plurality of setting items and lined up in a second direction (horizontal direction in the example shown in FIG. 10C) different from the first direction but also one or more second setting candidate lists d4, d5 each composed of a plurality of setting candidates lined up in a third direction (oblique directions in the example shown in FIG. 10C) different from the first and second directions, one list across another. The second setting candidate lists d4, d5 each present a plurality of setting candidates for a particular setting item received by the setting item entry section 105. The display control section 103 is configured to allow the display 71 to provide, with the setting window D3 displayed, respective scrolling displays of the setting item list d1, the first setting candidate list d2, and the second setting candidate lists d4, d5 according to their respective scroll gestures received by the gesture receiving section 102.

Figure 11:
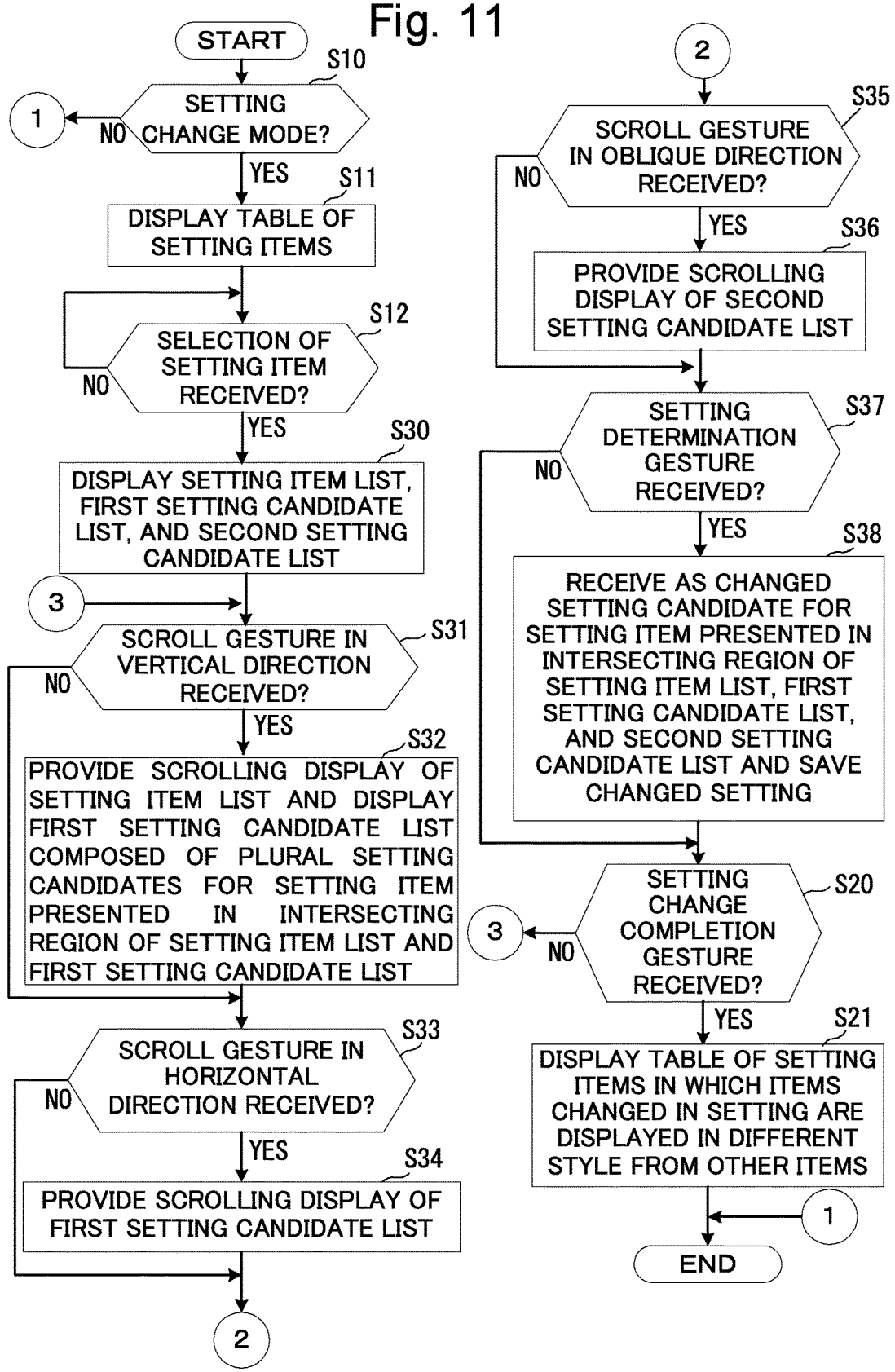
FIG. 11 is a flowchart showing a processing flow of the image forming apparatus according to Embodiment 2 of the present disclosure.
Figure 12:
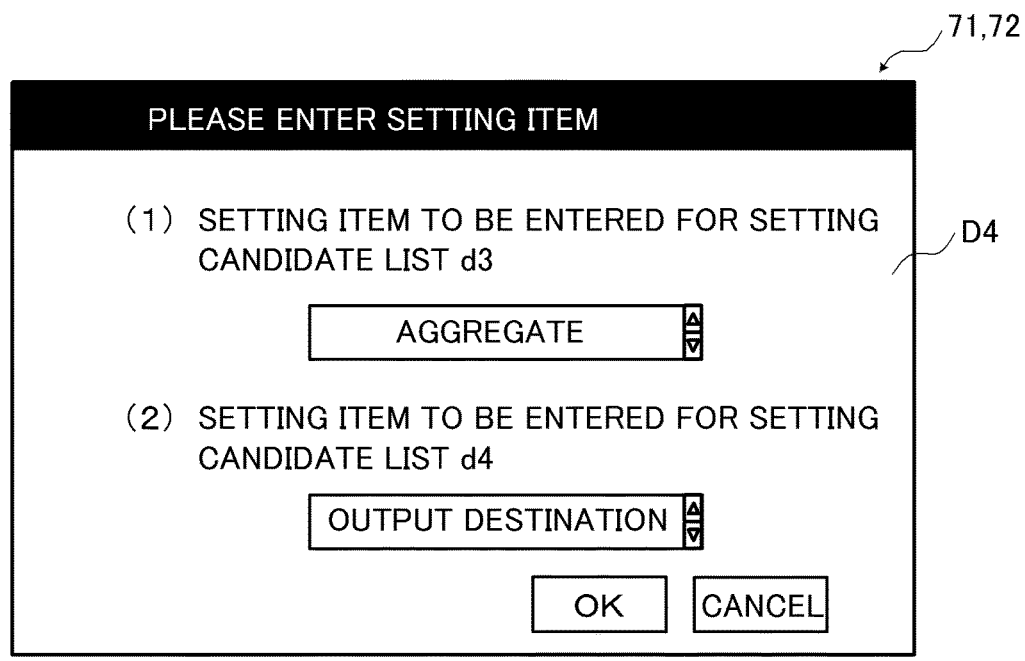
FIG. 12 shows a display example of a setting item entry screen displayed on the display of the image forming apparatus according to Embodiment 2 of the present disclosure.

FIG. 11 is a flowchart showing a processing flow of the image forming apparatus 1 according to Embodiment 2 of the present disclosure. The same pieces of processing as those illustrated in the flowchart of FIG. 4 are designated by the same references and further explanation thereof will be omitted. FIG. 12 shows a display example of a setting item entry screen D4 displayed on the display 71 of the image forming apparatus 1 according to Embodiment 2 of the present disclosure. FIGS. 13A to 13C and 14 show other display examples of the setting screen displayed on the display 71 of the image forming apparatus 1 according to Embodiment 2 of the present disclosure.

If the gesture receiving section 102 has received a selection of one setting item (YES in step S12), the display control section 103 allows the display 71 to user-visibly display a setting window D3 for the selected setting item by overlaying the setting window D3 on the setting screen D1 (step S30). At this time, the display control section 103 allows the display 71 to present, in an intersecting region d3 of the setting item list d1, the first setting candidate list d2, and the second setting candidate lists d4 and d5, the setting item the selection of which has been received in step S12. Furthermore, the display control section 103 allows the display 71 to present, in the first setting candidate list d2, a plurality of setting candidates for the setting item presented in the intersecting region d3. Since, in the example shown in FIGS. 10B and 10C, "ORIGINAL SIZE" is selected as the setting item, a plurality of setting candidates, such as "A3", "A4", and "B3", for the changeable setting of the setting item "ORIGINAL SIZE" are presented in the first setting candidate list d2. In addition, "A4", which is the current setting of the setting item "ORIGINAL SIZE", is presented in the intersecting region d3.

Moreover, the display control section 103 allows the display 71 to present, in each of the second setting candidate lists d4 and d5, a plurality of setting candidates for the particular setting item received by the setting item entry section 105. In the example shown in FIG. 12, the setting items "AGGREGATE" and "OUTPUT DESTINATION" are entered as those for the second setting candidate lists d4 and d5, respectively. Thus, the second setting candidate list d4 presents a plurality of setting candidates, such as "2 in 1" and "4 in 1", for the changeable setting of the setting item "AGGREGATE" and the second setting candidate list d5 presents a plurality of setting candidates, such as "Tray A" and "Tray B", for the changeable setting of the setting item "OUTPUT DESTINATION" (see FIG. 10C).

Then, the display control section 103 determines, with the setting window D3 displayed, whether or not the gesture receiving section 102 has received a scroll gesture in a vertical direction (step S31).

If the scroll gesture in the vertical direction has been received (YES in step S31), the display control section 103 allows the display 71 to provide a scrolling display of the setting item list d1 and present, in the first setting candidate list d2, a plurality of setting candidates for the setting item presented in the intersecting region d3 of the setting item list d1, the first setting candidate list d2, and the second setting candidate lists d4, d5 by the scrolling display (step S32). In the example shown in FIG. 13A, a scroll gesture in a vertical direction from the state shown in FIG. 10C has been received and a scrolling display of the setting item list d1 is thus provided, so that the setting item "DARKNESS" is presented in the intersecting region d3. In this case, the setting candidates presented in the first setting candidate list d2 are changed from those for the setting item "ORIGINAL SIZE" to those for the setting item "DARKNESS".

Furthermore, the display control section 103 determines, with the setting window D3 displayed, whether or not the gesture receiving section 102 has received a scroll gesture in a horizontal direction (step S33).

If the scroll gesture in the horizontal direction has been received (YES in step S33), the display control section 103 allows the display 71 to provide a scrolling display of the first setting candidate list d2 (step S34). In the example shown in FIG. 13B, a scroll gesture in a horizontal direction from the state shown in FIG. 13A has been received and a scrolling display of the first setting candidate list d2 is thus provided, so that "+1" is presented as a setting candidate for the setting item "DARKNESS" in the intersecting region d3 of the setting item list d1, the first setting candidate list d2, and the second setting candidate lists d4, d5. In the example shown in FIG. 13C, a scroll gesture in a horizontal direction from the state shown in FIG. 10C has been received and a scrolling display of the first setting candidate list d2 is thus provided, so that "A5" is presented as a setting candidate for the setting item "ORIGINAL SIZE" in the intersecting region d3 of the setting item list d1 and the first setting candidate list d2.

Moreover, the display control section 103 determines, with the setting window D3 displayed, whether or not the gesture receiving section 102 has received a scroll gesture in an oblique direction (step S35).

If the scroll gesture in the oblique direction has been received (YES in step S35), the display control section 103 allows the display 71 to provide a scrolling display of the second setting candidate list d4 or d5 (step S36). In the example shown in FIG. 14, a scroll gesture in a direction from a right obliquely upward to a left obliquely downward from the state shown in FIG. 13C has been received and a scrolling display of the second setting candidate list d5 is thus provided, so that "Tray C" is presented as a setting candidate for the setting item "OUTPUT DESTINATION" in the intersecting region d3.

Figure 13A:
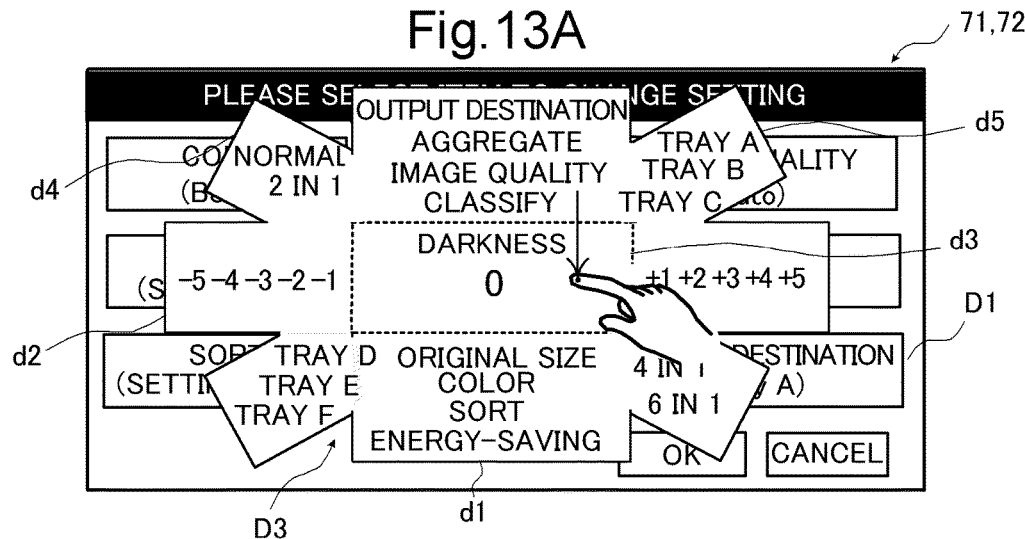
FIGS. 13A, 13B, and 13C show other display examples of the setting screen displayed on the display of the image forming apparatus according to Embodiment 2 of the present disclosure.
Figure 13B:
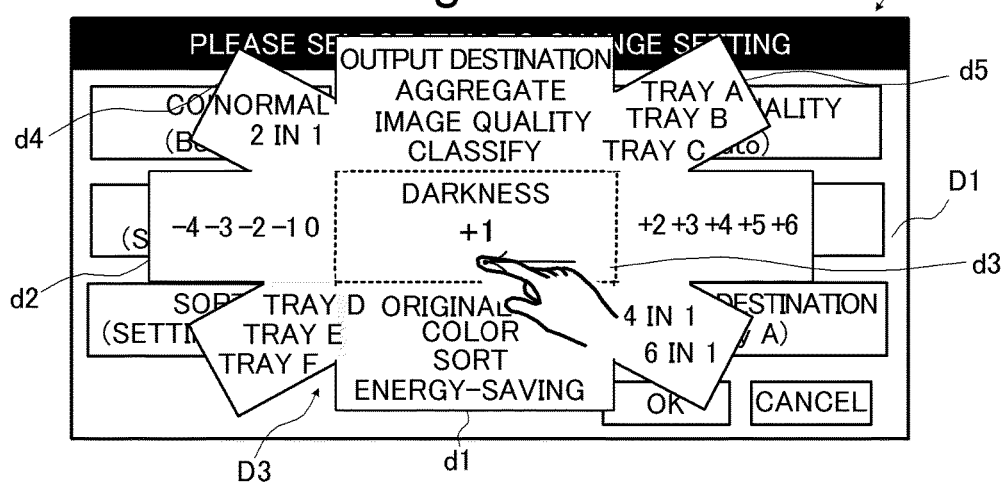
Figure 13C:
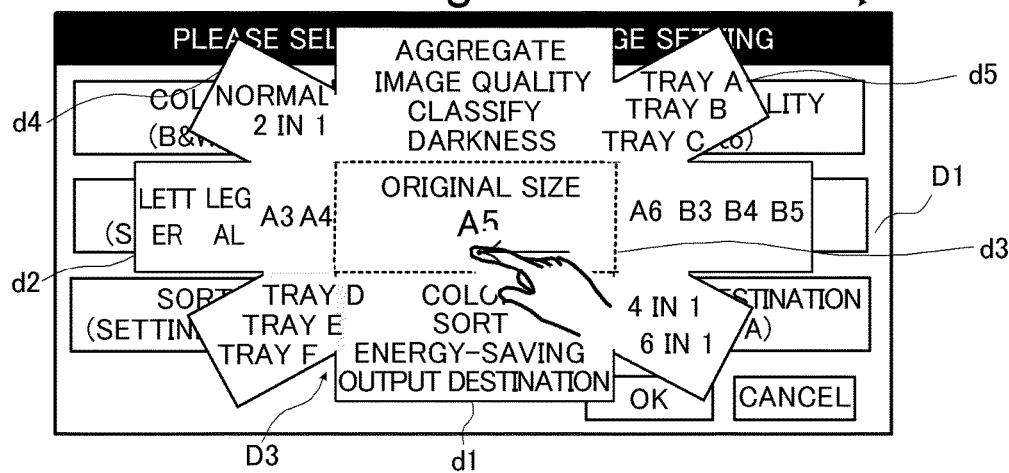
Figure 14:
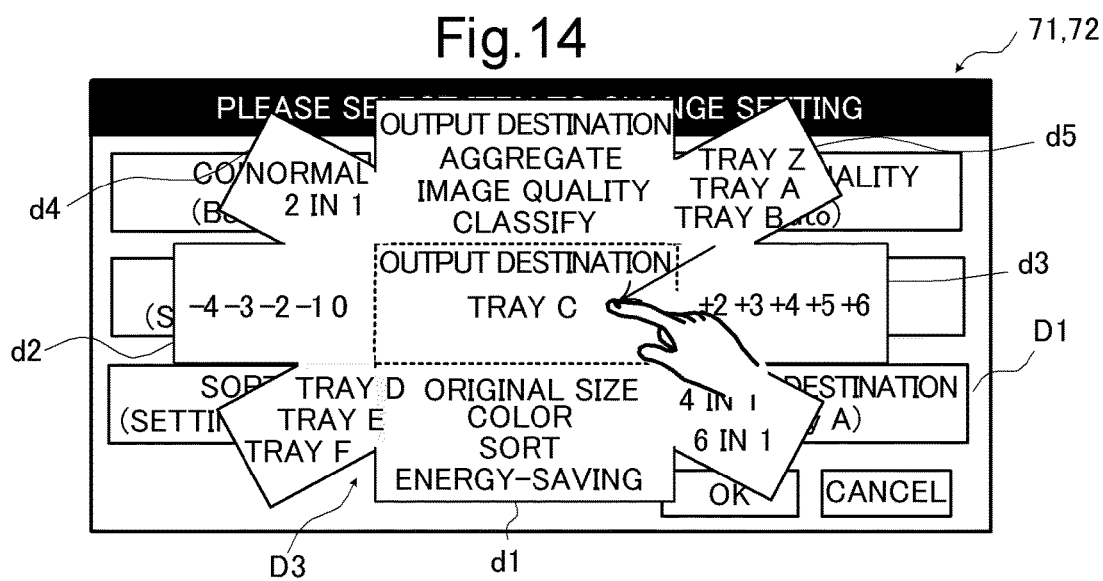
FIG. 14 shows another display example of the setting screen displayed on the display of the image forming apparatus according to Embodiment 2 of the present disclosure.

Furthermore, during the scrolling display of the setting item list d1, the first setting candidate list d2 or the second setting candidate list d4 or d5, the display control section 103 allows the display 71 to cyclically display setting items or setting candidates. In the example shown in FIG. 10C, the setting item "AGGREGATE" is presented at the top of the setting item list d1 and the setting item "OUTPUT DESTINATION" is presented at the bottom of the setting item list d1. Then, upon receipt of a scroll gesture in a vertical direction from the above state, the setting items of the setting item list d1 are cyclically displayed, so that as shown in FIG. 13A the setting item "OUTPUT DESTINATION" is presented at the top of the setting item list d1.

Then, the display control section 103 determines whether or not the gesture receiving section 102 has received a predetermined setting determination gesture (step S37). The predetermined setting determination gesture is, for example, a gesture of two touches anywhere on the display region of the touch panel 72 within a predetermined period of time (a double-touch gesture).

If the setting determination gesture has been received (YES in step S37), the setting receiving section 104 receives as a changed setting the setting candidate for the setting item being presented in the intersecting region d3 of the setting item list d1, the first setting candidate list d2, and the second setting candidate lists d4 and d5 at the point in time and allows the HDD 50 to save the changed setting (step S38).

As thus far described, in the display input apparatus according to Embodiment 2 of the present disclosure, the display control section 103 allows the display 71 to display not only the setting item list d1 composed of a plurality of setting items lined up in a first direction and the first setting candidate list d2 composed of a plurality of setting candidates lined up in a second direction different from the first direction but also the second setting candidate list d4, d5 composed of a plurality of setting candidates lined up in a third direction different from the first and second directions, with the setting item list d1 and the first and second setting candidate list d2, d4, d5 across each other. The display control section 103 allows, when the gesture receiving section 102 receives a scroll gesture in the first direction, the display 71 to provide a scrolling display of the setting item list d1 and display the first setting candidate list d2 composed of a plurality of setting candidates for the setting item presented in the intersecting region d3 of the setting item list d1 and the first setting candidate list d2 by the scrolling display, allows, when the gesture receiving section 102 receives a scroll gesture in the second direction, the display 71 to provide a scrolling display of the first setting candidate list d2, and allows, when the gesture receiving section 102 receives a scroll gesture in the third direction, the display 71 to provide a scrolling display of the second setting candidate list d4 or d5 presenting a plurality of setting candidates for a particular one of the plurality of setting items. Furthermore, the setting receiving section 104 is configured to receive as a changed setting the setting candidate presented in the intersecting region d3 of the setting item list d1 and the first and second setting candidate regions d2, d4, d5 by the scroll gesture received by the gesture receiving section 102.

In the above configuration, the second setting candidate list d4, d5 presents a plurality of setting candidates for a particular one of a plurality of setting items. If a setting item or the like frequently used to change its setting is previously entered, the setting can be changed only a scroll gesture in an oblique direction, without the need to make a scroll gesture in a vertical direction as a user's gesture for selecting the desired setting item, so that the settings of a plurality of setting items can be changed with still simpler manipulation.

<Embodiment 3>

Figure 15:
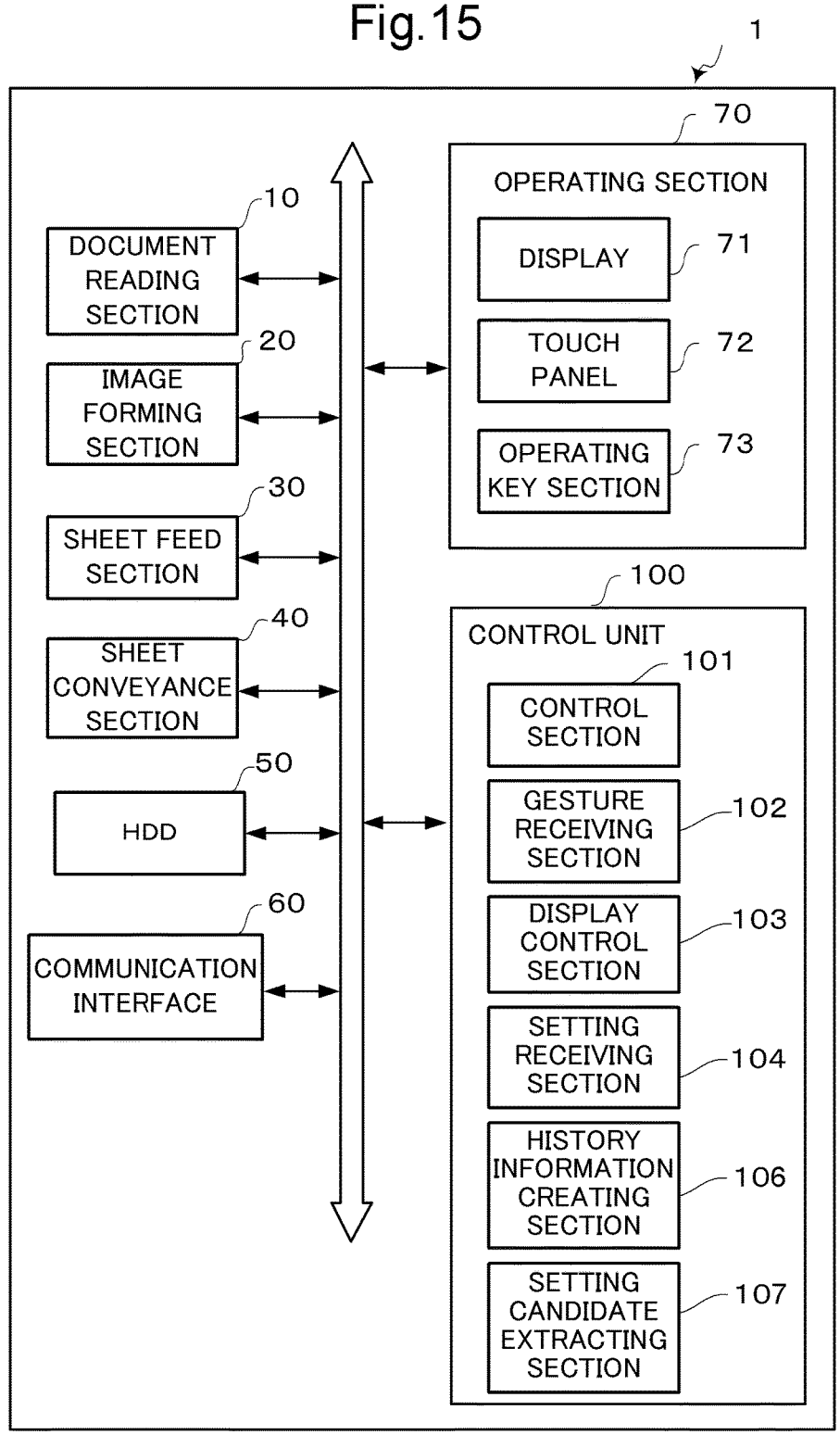
FIG. 15 is a functional block diagram showing an essential internal configuration of an image forming apparatus as an example of a display input apparatus according to Embodiment 3 of the present disclosure.

FIG. 15 is a functional block diagram showing an essential internal configuration of an image forming apparatus as an example of a display input apparatus according to Embodiment 3 of the present disclosure.

A control unit 100 of an image forming apparatus 1 according to Embodiment 3 of the present disclosure functions not only as the aforementioned sections described in Embodiment 1 but also as a history information creating section 106 and a setting candidate extracting section 107 when a display input control program stored in its internal ROM or on an HDD 50 is executed by its internal CPU.

The history information creating section 106 has the function of creating history information. The history information is information indicating a history of settings whose changes have ever been received by the setting receiving section 104 of the control unit 100 and, specifically, contains the names of settings whose changes have been received, the times and dates when the changes of settings have been received, and the number of times that a change of each setting has been received. The history information creating section 106 allows the HDD 50 to save created history information.

The setting candidate extracting section 107 has the function of extracting, based on the history information created by the history information creating section 106 and stored on the HDD 50, some of setting candidates for the settings changeable on the image forming apparatus 1. Specifically, the setting candidate extracting section 107 is configured to extract, from among setting candidates for the settings changeable on the image forming apparatus, a predetermined number of setting candidates in chronological order from the setting candidate most recently received as a changed setting in all the setting candidates contained in the history information. Additionally or alternatively, the setting candidate extracting section 107 is configured to extract, from among the setting candidates for the settings changeable on the image forming apparatus, a predetermined number of setting candidates in decreasing order from the setting candidate most frequently received as a changed setting in all the setting candidates contained in the history information. The setting candidates extracted by the setting candidate extracting section 107 are displayed as one or more second setting candidate lists d6, d7 in a lined-up manner by the display control section 103.

Figure 16A:
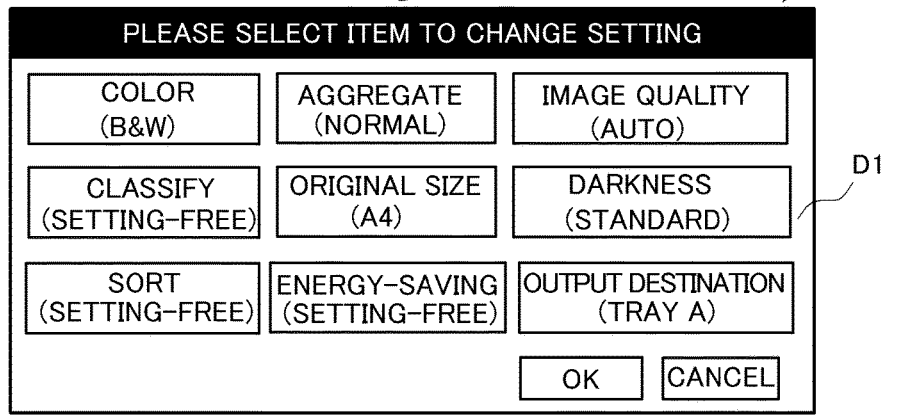
FIGS. 16A, 16B, and 16C show display examples of a setting screen displayed on a display of the image forming apparatus according to Embodiment 3.
Figure 16B:
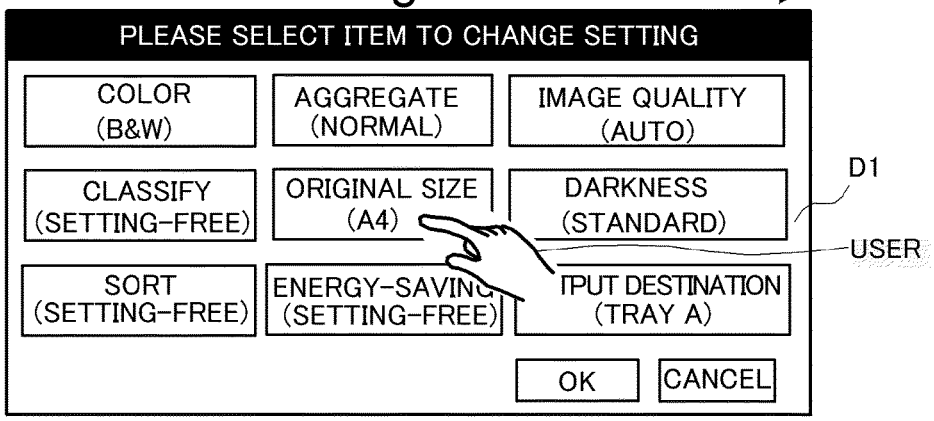
Figure 16C:
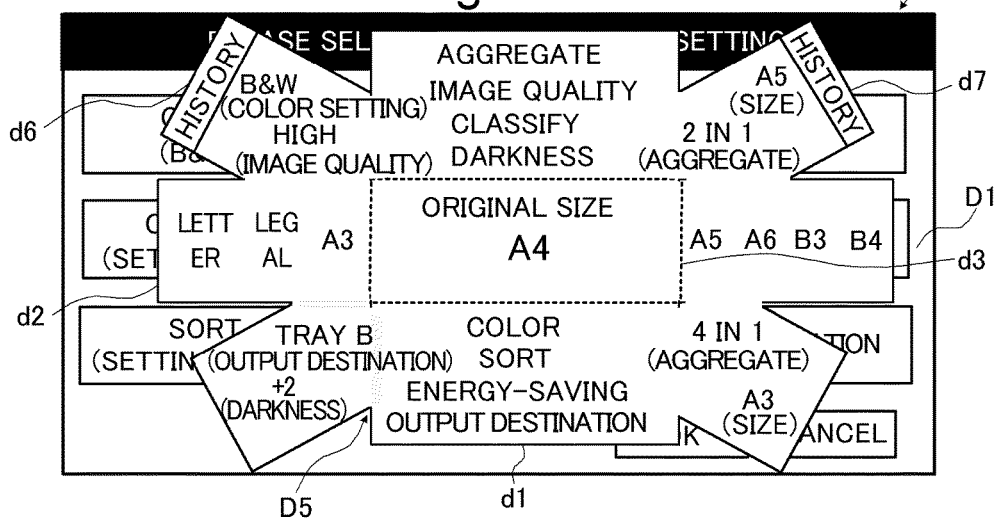

FIGS. 16A to 16C show display examples of a setting screen displayed on a display 71 of the image forming apparatus 1 according to Embodiment 3.

FIGS. 16A and 16B show the same setting screen D1 as displayed on the display 71 of the image forming apparatus 1 according to Embodiment 1 shown in FIGS. 3A and 3B. When, as shown in FIG. 16B, the gesture receiving section 102 receives a selection of one of the plurality of setting items via a touch gesture, the display control section 103 allows the display 71 to user-visibly display, in the center of the display 71, a setting window D5 for the selected setting item by overlaying the setting window D5 on the setting screen D1 (see FIG. 16C). In this case, the setting window D5 is formed by arranging a setting item list d1 composed of a plurality of setting items lined up in a first direction (vertical direction in the example shown in FIG. 16C), a first setting candidate list d2 composed of a plurality of setting candidates listed for the selected one of the plurality of setting items and lined up in a second direction (horizontal direction in the example shown in FIG. 16C) different from the first direction, and one or more second setting candidate lists d6, d7 each composed of a plurality of setting candidates extracted by the setting candidate extracting section 107 and lined up in a third direction (oblique directions in the example shown in FIG. 16C) different from the first and second directions, one list across another. The display control section 103 is configured to allow the display 71 to provide, with the setting window D5 displayed, respective scrolling displays of the setting item list d1, the first setting candidate list d2, and the second setting candidate lists d6, d7 according to their respective scroll gestures received by the gesture receiving section 102.

Figure 17A:
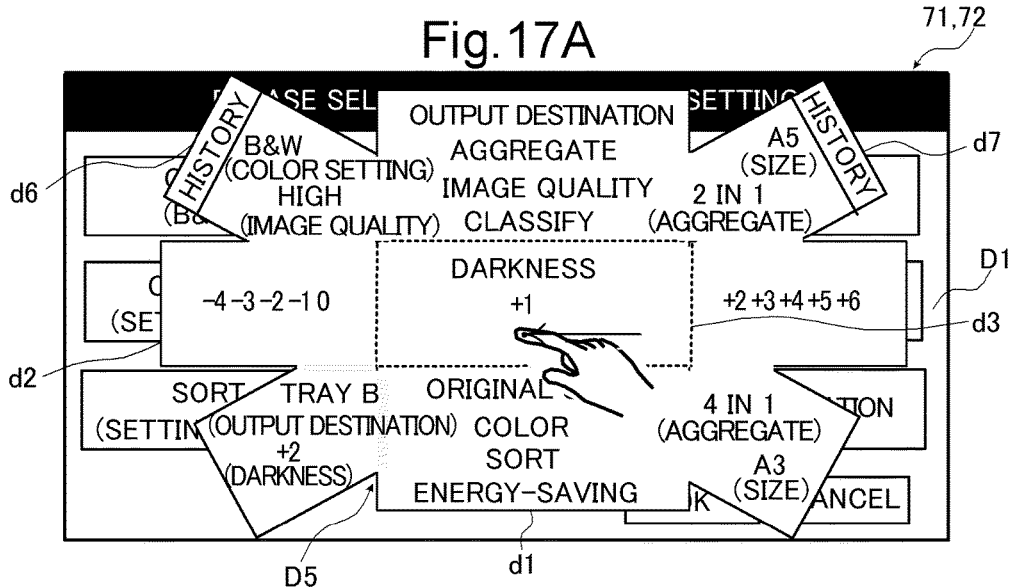
FIGS. 17A and 17B show display examples of the setting screen displayed on the display of the image forming apparatus according to Embodiment 3 when a scroll gesture in an oblique direction has been received.
Figure 17B:
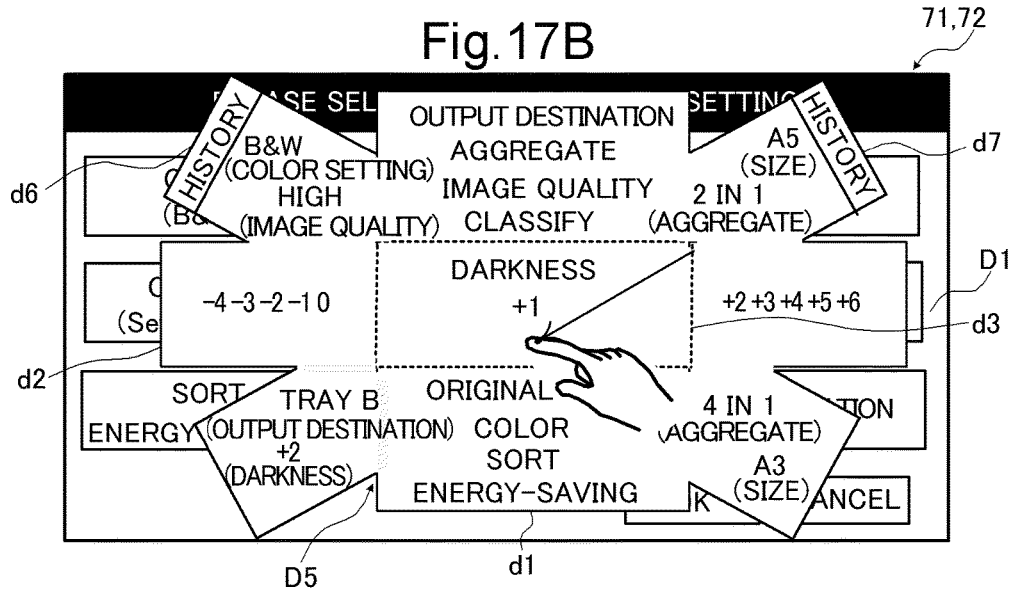

FIGS. 17A and 17B show display examples of the setting screen displayed on the display 71 of the image forming apparatus 1 according to Embodiment 3 when the gesture receiving section 102 receives a scroll gesture in an oblique direction.

When the gesture receiving section 102 receives a scroll gesture in an oblique direction, the display control section 103 allows the display 71 to provide a scrolling display of the second setting candidate list d6 or d7. In the example shown in FIG. 17B, a scroll gesture in a direction from a right obliquely upward to a left obliquely downward from the state shown in FIG. 17A is input. In this case, the display control section 103 allows the display 71 to provide a scrolling display of the second setting candidate list d7, so that the region d3 next presents "2 in 1" as a setting candidate for the setting item "AGGREGATE".

Thereafter, when the gesture receiving section 102 receives a predetermined setting determination gesture, the setting receiving section 104 receives as a changed setting the setting candidate for the setting item being presented in the intersecting region d3 of the setting item list d1, the first setting candidate list d2, and the second setting candidate lists d6 and d7 at the point in time and allows the HDD 50 to save the changed setting.

As thus far described, the display input apparatus according to Embodiment 3 of the present disclosure includes: the history information creating section 106 configured to create history information indicating a history of settings whose changes have ever been received by the setting receiving section 104; and the setting candidate extracting section 107 configured to extract some of the plurality of setting candidates based on the history information. Furthermore, the display control section 103 allows the display 71 to display the setting item list d1 composed of a plurality of setting items lined up in a first direction, the first setting candidate list d2 composed of a plurality of setting candidates listed for one of the plurality of setting items and lined up in a second direction different from the first direction, and the second setting candidate list d6, d7 composed of setting candidates extracted by the setting candidate extracting section 107 and lined up in a third direction different from the first and second directions, with the setting item list d1 and the first and second setting candidate list d2, d6, d7 across each other.

According to the above configuration, the same setting screen presents not only the setting item list d1 and the first setting candidate list d2 but also one or more lists of setting candidates extracted based on history information (the second setting candidate lists d6, d7). The user can select, on the common setting screen, setting candidates frequently received as changed settings and setting candidates recently used to change the settings and can change the settings on the same setting screen, which is highly user-friendly.

The display input control program described in the above embodiments may be one stored on a computer-readable non-transitory recording medium, such as a hard disk, a CD-ROM, a DVD-ROM or a semiconductor memory.

Although in the above embodiments the image forming apparatus has been taken as an example of the display input apparatus, the present disclosure is not necessarily limited to this. The display input apparatus applicable as one embodiment of the present disclosure may be, besides the image forming apparatus, for example, a mobile terminal, such as a tablet terminal or a smartphone, a personal computer or a television set.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A display input apparatus comprising:
a display;
a touch panel disposed in front of the display;
a gesture receiving section configured to receive a user's gesture on the touch panel;
a display control section configured to control a display operation of the display according to a user's gesture received by the gesture receiving section; and
a setting receiving section capable of receiving changes of settings of a plurality of setting items according to user's gestures received by the gesture receiving section,
wherein the display control section allows the display to display a setting item list composed of the plurality of setting items lined up in a first direction and a first setting candidate list composed of a plurality of setting candidates listed for one of the plurality of setting items and lined up in a second direction different from the first direction, with the setting item list and the first setting candidate list across each other, allows, when the gesture receiving section receives a scroll gesture in the first direction, the display to provide a scrolling display of the setting item list and display the first setting candidate list composed of a plurality of setting candidates for the setting item presented in an intersecting region of the setting item list and the first setting candidate list by the scrolling display, and allows, when the gesture receiving section receives a scroll gesture in the second direction, the display to provide a scrolling display of the first setting candidate list,
the setting receiving section is configured to receive as a changed setting the setting candidate presented in the intersecting region of the setting item list and the first setting candidate list by the scroll gesture received by the gesture receiving section,
the display control section is further configured to allow the display to display not only the setting item list and the first setting candidate list but also a second setting candidate list composed of a plurality of setting candidates listed for a particular one of the plurality of setting items and lined up in a third direction different from the first and second directions, with the setting item list and the first and second setting candidate lists across one another in the intersecting region, and in a case where the gesture receiving section receives a scroll gesture in the third direction, allow the display to display, in the intersecting region, one of the plurality of setting candidates shown in the second setting candidate list when allowing the display to provide a scrolling display of the second setting candidate list in the third direction indicated by the scroll gesture, and when the scrolling display in the third direction is provided, the setting receiving section is configured to receive as the changed setting the setting candidate presented in the intersecting region, the setting candidate being one of the plurality of setting candidates shown in the second setting candidate list.

2. The display input apparatus according to claim 1, wherein the display control section is further configured to allow the display to display a table of the plurality of setting items with respective images of each of the setting items and allow, when the gesture receiving section receives a selection of one of the respective images indicating the plurality of setting items via a touch gesture, the display to user-visibly display the setting item list, the first setting candidate list, and the second setting candidate list by overlaying the setting item list and the first setting candidate list on the table of the plurality of setting items.

3. A computer-readable non-transitory recording medium with a display input control program recorded thereon, the display input control program allowing a computer to function as:

a gesture receiving section configured to receive a user's gesture on a touch panel;

a display control section configured to control a display operation of a display according to a user's gesture received by the gesture receiving section; and a setting receiving section capable of receiving changes of settings of a plurality of setting items according to user's gestures received by the gesture receiving section, the display input control program further allowing the computer to function so that the display control section allows the display to display a setting item list composed of the plurality of setting items lined up in a first direction and a setting candidate list composed of a plurality of setting candidates listed for one of the plurality of setting items and lined up in a second direction different from the first direction, with the setting item list and the setting candidate list across each other, allows, when the gesture receiving section receives a scroll gesture in the first direction, the display to provide a scrolling display of the setting item list and display the setting candidate list composed of a plurality of setting candidates for the setting item presented in an intersecting region of the setting item list and the setting candidate list by the scrolling display, and allows, when the gesture receiving section receives a scroll gesture in the second direction, the display to provide a scrolling display of the setting candidate list, the display input control program further allowing the computer to function so that the setting receiving section receives as a changed setting the setting candidate presented in the intersecting region of the setting item list and the setting candidate list by the scroll gesture received by the gesture receiving section, and the display input control program further allowing the computer to function so that:

the display control section allows the display to display not only the setting item list and the first setting candidate list but also a second setting candidate list composed of a plurality of setting candidates listed for a particular one of the plurality of setting items and lined up in a third direction different from the first and second directions, with the setting item list and the first and second setting candidate lists across one another in the intersecting region, and in a case where the gesture receiving section receives a scroll gesture in the third direction, allows the display to display, in the intersecting region, one of the plurality of setting candidates shown in the second setting candidate list when the display control section allows the display to provide a scrolling display of the second setting candidate list in the third direction indicated by the scroll gesture, and when the scrolling display in the third direction is provided, the setting receiving section receives as the changed setting the setting candidate presented in the intersecting region, the setting candidate being one of the plurality of setting candidates shown in the second setting candidate list.

* * * * *